United States Patent
Li et al.

(10) Patent No.: US 9,894,576 B2
(45) Date of Patent: Feb. 13, 2018

(54) METHOD AND SYSTEM FOR TRANSFERRING USER EQUIPMENT IN MOBILE COMMUNICATION SYSTEM

(71) Applicant: Huawei Technologies Co., Ltd., Shenzhen (CN)

(72) Inventors: Qingyu Li, Beijing (CN); Xiaolong Guo, Beijing (CN); Ying Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 78 days.

(21) Appl. No.: 14/933,936

(22) Filed: Nov. 5, 2015

(65) Prior Publication Data

US 2016/0066230 A1    Mar. 3, 2016

Related U.S. Application Data

(63) Continuation of application No. 14/161,407, filed on Jan. 22, 2014, now Pat. No. 9,215,625, which is a
(Continued)

(30) Foreign Application Priority Data

Aug. 15, 2006   (CN) .......................... 2006 1 0115390

(51) Int. Cl.
*H04W 4/00*        (2009.01)
*H04W 36/12*       (2009.01)
(Continued)

(52) U.S. Cl.
CPC ............. *H04W 36/12* (2013.01); *H04L 47/70* (2013.01); *H04L 47/767* (2013.01);
(Continued)

(58) Field of Classification Search
CPC ... H04W 36/12; H04W 36/22; H04W 36/385; H04W 36/0011; H04L 12/5695; H04L 47/767; H04L 47/824
See application file for complete search history.

(56) References Cited

U.S. PATENT DOCUMENTS 6,847,610 B1    1/2005   Suumaki et al.
7,145,895 B2   12/2006   Mueckenheim et al.
(Continued)

FOREIGN PATENT DOCUMENTS

CN    1561648 A    1/2005
CN    1882151 A   12/2006
(Continued)

OTHER PUBLICATIONS

Notice of Allowance in corresponding U.S. Appl. No. 12/371,174 (dated May 22, 2013).
(Continued)

*Primary Examiner* — Kevin Mew
(74) *Attorney, Agent, or Firm* — Leydig, Voit & Mayer, Ltd.

(57) ABSTRACT

A method and system for transferring user equipment (UE) in a mobile communication system are disclosed. According to the method, a source core (CN) network determines to transfer a UE that it serves and sends a transfer instruction carrying UE transfer restriction information to the UE; an access network receives a transfer request that is sent by the UE according to the restriction information carried in the transfer instruction; the access network selects a target CN entity that is different from the source CN entity for the UE; and the UE is transferred to the target CN entity. The method and system provided by the disclosure are applicable to user transferring between CN entities in any communication network. The transferring is initiated by a network side
(Continued)

entity, and a more preferable CN entity is selected for the UE to provide a better service.

18 Claims, 24 Drawing Sheets

Related U.S. Application Data continuation of application No. 13/662,419, filed on Oct. 27, 2012, now Pat. No. 8,670,426, which is a continuation of application No. 12/371,174, filed on Feb. 13, 2009, now Pat. No. 8,509,200, which is a continuation of application No. PCT/CN2007/070492, filed on Aug. 15, 2007.

(51) Int. Cl.
*H04L 12/919* (2013.01)
*H04L 12/911* (2013.01)
*H04W 36/22* (2009.01)
*H04W 36/00* (2009.01)
*H04W 36/38* (2009.01)

(52) U.S. Cl.
CPC ....... *H04L 47/824* (2013.01); *H04W 36/0011* (2013.01); *H04W 36/22* (2013.01); *H04W 36/385* (2013.01)

(56) References Cited

U.S. PATENT DOCUMENTS

| | | | |
|---|---|---|---|
| 7,512,104 B2 | 3/2009 | Bjelland et al. | |
| 7,539,186 B2 | 5/2009 | Aerrabotu et al. | |
| 7,764,680 B2 | 7/2010 | Matsumoto et al. | |
| 7,912,004 B2 | 3/2011 | Gallagher et al. | |
| 7,940,735 B2 | 5/2011 | Kozisek et al. | |
| 8,111,712 B2 | 2/2012 | Mutikainen et al. | |
| 8,121,052 B2 | 2/2012 | Zheng et al. | |
| 8,145,228 B2 | 3/2012 | Casaccia et al. | |
| 8,149,771 B2 | 4/2012 | Khivesara et al. | |
| 8,244,250 B2 | 8/2012 | Narasimha et al. | |
| 8,402,147 B2 | 3/2013 | Bondy | |
| 8,514,813 B2 | 8/2013 | Zhang et al. | |
| 8,670,426 B2 | 3/2014 | Li et al. | |
| 8,989,139 B2* | 3/2015 | Wu | H04M 15/00 370/328 |
| 9,204,340 B2* | 12/2015 | Kim | H04L 45/306 |
| 9,386,452 B2* | 7/2016 | Zhang | H04W 12/08 |
| 9,532,277 B2* | 12/2016 | Xu | H04W 8/06 |
| 9,736,738 B2* | 8/2017 | Zhang | H04W 36/0033 |
| 2003/0153309 A1 | 8/2003 | Bjelland et al. | |
| 2004/0248592 A1 | 12/2004 | Turina et al. | |
| 2004/0258018 A1 | 12/2004 | Bjelland | |
| 2004/0266438 A1 | 12/2004 | Bjelland et al. | |
| 2006/0193289 A1 | 8/2006 | Ronneke et al. | |
| 2007/0004429 A1 | 1/2007 | Edge et al. | |
| 2007/0076715 A1 | 4/2007 | Bauer et al. | |
| 2007/0091877 A1 | 4/2007 | Lundin et al. | |
| 2007/0281695 A1 | 12/2007 | Lohr et al. | |
| 2007/0291695 A1 | 12/2007 | Sammour et al. | |
| 2008/0019320 A1 | 1/2008 | Phan et al. | |
| 2008/0242301 A1* | 10/2008 | Osterling | H04W 36/08 455/436 |
| 2008/0259873 A1* | 10/2008 | Ahmavaara | H04W 36/0033 370/331 |
| 2008/0316980 A1 | 12/2008 | Ahlen et al. | |
| 2009/0185535 A1 | 7/2009 | Lee et al. | |
| 2010/0014463 A1 | 1/2010 | Nagai et al. | |
| 2010/0014532 A1 | 1/2010 | Wakayama et al. | |
| 2010/0054207 A1* | 3/2010 | Gupta | H04W 36/14 370/331 |
| 2010/0184432 A1* | 7/2010 | Yano | H04W 36/12 455/435.1 |
| 2010/0291941 A1 | 11/2010 | Chen et al. | |
| 2010/0329208 A1* | 12/2010 | Hayashi | H04L 63/126 370/331 |
| 2011/0170517 A1* | 7/2011 | Bakker | H04W 36/0033 370/331 |
| 2011/0249654 A1* | 10/2011 | Yu | H04W 36/0005 370/331 |
| 2011/0261786 A1 | 10/2011 | Bontu et al. | |
| 2011/0281584 A1* | 11/2011 | Sander | H04W 12/08 455/436 |
| 2012/0064896 A1* | 3/2012 | Guo | H04W 36/22 455/436 |
| 2012/0218974 A1* | 8/2012 | Zhou | H04L 69/161 370/331 |
| 2012/0252464 A1* | 10/2012 | Borst | H04W 36/22 455/443 |
| 2013/0178210 A1* | 7/2013 | Wang | H04W 36/08 455/436 |
| 2014/0185585 A1* | 7/2014 | Zhang | H04W 36/0033 370/331 |
| 2014/0192782 A1* | 7/2014 | Centonza | H04W 36/0005 370/331 |
| 2014/0287757 A1* | 9/2014 | Borg | H04W 8/26 455/436 |
| 2016/0219476 A1* | 7/2016 | Onishi | H04L 61/1511 |

FOREIGN PATENT DOCUMENTS

| | | |
|---|---|---|
| CN | 100584093 C | 1/2010 |
| EP | 1684468 A1 | 7/2006 |
| WO | WO 03017704 A1 | 2/2003 |
| WO | WO 03019958 A1 | 3/2003 |
| WO | WO 2004084572 A1 | 9/2004 |
| WO | WO 2005064954 A1 | 7/2005 |
| WO | WO 2006024307 A1 | 3/2006 |
| WO | WO 2007107088 A1 | 9/2007 |

OTHER PUBLICATIONS

Notice of Allowance in corresponding U.S. Appl. No. 13/662,419 (dated Oct. 23, 2013).
Notice of Allowance in corresponding U.S. Appl. No. 14/161,407 (dated Aug. 6, 2015).
$1^{st}$ Office Action in corresponding U.S. Appl. No. 12/371,174 (dated Oct. 4, 2011).
$2^{nd}$ Office Action in corresponding U.S. Appl. No. 12/371,174 (dated Apr. 27, 2012).
$3^{rd}$ Office Action in corresponding U.S. Appl. No. 12/371,174 (dated Nov. 6, 2012).
$1^{st}$ Office Action in corresponding U.S. Appl. No. 13/662,419 (dated Mar. 21, 2013).
$2^{nd}$ Office Action in corresponding U.S. Appl. No. 13/662,419 (dated May 16, 2013).
$1^{st}$ Office Action in corresponding U.S. Appl. No. 14/161,407 (dated Aug. 15, 2014).
$2^{nd}$ Office Action in corresponding U.S. Appl. No. 14/161,407 (dated Mar. 6, 2015).
"3GPP TS 23.236—Technical Specification Group Services and System Aspects; Intra-domain connection of Radio Access Networks (RAN) nodes to multiple Core Network (CN) nodes (Release 6)," Version 6.3.0, $3^{rd}$ Generation Partnership Project, Valbonne, France (Mar. 2006).
"3GPP TS 23.060—Technical Specification Group Services and System Aspects; General Packet Radio Service (GPRS); Service description; Stage 2 (Release 7)," Version 7.1.0, $3^{rd}$ Generation Partnership Project, Valbonne, France (Jun. 2006).
"3GPP TR 23.882—Technical Specification Group Services and System Aspects; 3GPP System Architecture Evolution: Report on Technical Options and Conclusions (Release 7)," Version 1.3.0, $3^{rd}$ Generation Partnership Project, Valbonne, France (Jul. 2006).
"3GPP TR 23.882—Technical Specification Group Services and System Aspects; 3GPP System Architecture Evolution: Report on Technical Options and Conclusions (Release 7)," Version 1.2.33.0, $3^{rd}$ Generation Partnership Project, Valbonne, France (Jul. 6, 2006).

(56) References Cited

OTHER PUBLICATIONS

"Change Request—Introducing re-distribution of UEs in A/Gb/Iu-flex based pool configurations," 3GPP TSG-SA2 Meeting #48, Doc. S2-051993, Version 6.0.0, $3^{rd}$ Generation Partnership Project, Valbonne, France (Sep. 2005).

"Support for multi-to-multi relationship between MME-UPEs and Node Bs (S1-flex)," 3GPP TSG SA WG2 Architecture—S2 #50, Budapest, Hungary, Doc. S2-060563, Agenda Item 7.4.1.3, $3^{rd}$ Generation Partnership Project, Valbonne, France (Jan. 2006).

\* cited by examiner

METHOD AND SYSTEM FOR TRANSFERRING USER EQUIPMENT IN MOBILE COMMUNICATION SYSTEM

CROSS-REFERENCE TO RELATED APPLICATIONS

This application is a continuation of U.S. patent application Ser. No. 14/161,407, filed on Jan. 22, 2014, which is a continuation of U.S. patent application Ser. No. 13/662,419, filed on Oct. 27, 2012, now U.S. Pat. No. 8,670,426, which is a continuation of U.S. patent application Ser. No. 12/371,174, filed on Feb. 13, 2009, now U.S. Pat. No. 8,509,200, which is a continuation of International Patent Application No. PCT/CN2007/070492, filed Aug. 15, 2007. The International Application claims priority to Chinese Patent Application No. 200610115390.2, filed Aug. 15, 2006. All of the aforementioned patent applications are hereby incorporated by reference in their entirety.

FIELD OF THE INVENTION

Embodiments of the disclosure relate to a technology of managing a user equipment (UE) in a mobile communication system, and more particularly to a method and system for transferring a UE in a mobile communication system.

BACKGROUND

Currently, a $3^{rd}$ generation (3G) mobile communication system is mainly based on standards of wideband code division multiple access (WCDMA) and code division multiple access (CDMA) communication systems.

A so-called universal mobile telecommunication system (UMTS) is a 3G mobile communication system adopting the WCDMA air interface technology, and is thus usually referred to as a WCDMA communication system. The structure of the UMTS is shown in FIG. 1, which includes a UE, a radio access network (RAN), and a core network (CN). The RAN is a UMTS terrestrial radio access network (UTRAN), and is capable of handling all functions related to radio services. The CN handles all voice calls and data connections in the UMTS, and realizes switching and routing functions with external networks. The CN is logically divided into a circuit switched (CS) domain and a packet switched (PS) domain.

The structure of the UTRAN is shown in FIG. 2, and the UTRAN includes one or more radio network subsystems (RNSs). Each RNS is formed by a radio network controller (RNC) and one or more base stations (called NodeBs). The RNC is connected to the CN through an Iu interface, and the NodeB is connected to the RNC through an Iub interface. In the UTRAN, the RNCs are interconnected through an Iur interface. The RNCs can be classified into source RNC (SRNC) and target RNC (TRNC) for the UE. The RNC is configured to allocate and control radio resources of the NodeB connected or related thereto. The NodeB transmits data from the Iub interface to the UE through a Uu interface or transmits data from the Uu interface to the RNC through the Iub interface. The NodeB also participates in some radio resource management.

The network architectures shown in FIGS. 1 and 2 are old versions before 3GPP (3rd Generation Partnership Project) Release 6. Considering the network competitive power in the future, a brand new 3GPP evolved network architecture is developing to meet application requirements of the mobile communication network in the coming decade or even longer time. The evolved network architecture includes system architecture evolution (SAE) and long term evolution (LTE) of the access network, and an evolved access network is the so-called E-UTRAN (evolved UTRAN). The evolved network aims to provide a low delay, high data rate, high system capacity and coverage, and low cost network completely based on the Internet protocol (IP). Since the evolved network is a brand new network architecture, all the nodes, functions, and flows of the network architectures shown in FIGS. 1 and 2 change substantially.

Currently, 3GPP includes SAE and LTE. LTE aims to provide a low-cost network capable of reducing the delay, raising the user data rate, and improving the system capacity and coverage. The LTE adopts only PS domain services, and the bearer network is an IP bearer. FIG. 3 is a schematic architectural view of the current evolved network. The LTE RAN is an RAN of the evolved network. In the network, the nodes include, but are not limited to, one or more evolved NodeBs (eNodeBs) or control plane servers (CPSs). They are logically treated as LTE-RAN entities. Mobility management entity (MME) and user plane entity (UPE) are also logic entities. The MME is configured to store mobility management context of the UE, such as user ID, mobility status and tracking area (TA) information, and certificate the user of the UE. The UPE is configured to terminate the downstream data of the UE in an idle state, trigger a paging, and store the context of the UE, for example, the IP address and routing information of the UE. A user plane anchor may not change during a session of the UE. Whether the MME and the UPE are separate entities or not, it makes no difference to the method provided by the embodiments of the disclosure.

When the UMTS is advancing toward the evolved network, there is a stage that the UMTS and the evolved network coexist. As shown in FIG. 4, interfaces S3 and S4 are added between the UMTS and the evolved network. The interface S3 realizes the exchange of information carried by UEs in an idle and/or active state between 3GPP access systems. The interface S4 provides control and mobility support for user planes between the general packet radio service (GPRS) CN and 3GPP anchors.

Currently, in Section 4.5a.1 of 3GPP protocol TS23.236-630, a method of transferring all the UEs of a source CN element in a 3G or $2^{nd}$ generation (2G) network to other CN entities is provided. The method is implemented in three stages. In the first stage, UEs initiating a periodic routing area update (RAU) within a preset time limit are transferred according to a method shown in FIG. 5, and the involved network entities include a UE, an access network, a source CN element, and a target CN element. The method includes the following steps.

In Step 501, after entering an idle state, the UE activates a periodic RAU timer.

In Step 502, when the periodic RAU timer experiences a time-out, the UE sends an RAU request to the source CN element.

In Step 503, when the source CN element receives the RAU request sent by the UE, if the source CN element has already received an operation maintenance notification, all the UE loads have to be transferred to other CN entities. Thus, the source CN element sends an RAU acceptance message to the UE, and the message carries a temporary mobile subscriber identity (TMSI) re-allocated to the UE and a minute periodic RAU timer value (for example, 4 seconds) re-allocated to the UE. The network resource identifier (NRI) field of the TMSI is set as Null.

In Step 504, the UE receives the RAU acceptance message, and activates a new periodic RAU timer.

In Step 505, when the periodic RAU timer activated in Step 504 experiences a time-out, the UE sends an RAU request carrying the TMSI allocated to the UE in Step 503. After the access network receives the RAU request, as the NRI in the TMSI carried by the request is set as Null, the access network employs a non-access layer node selection function to choose a target CN element for the UE, and forwards the RAU request to the target CN element.

In Step 506, the target CN element receives the RAU request, and sends an RAU acceptance message to the UE.

However, the method in FIG. 5 has the following disadvantages. The method is only applicable to the circumstance of transferring all the UEs served by the source CN element. In the method, the source CN element passively waits for a UE to send a periodic RAU, instead of initiating the transferring of the whole or a part of the UEs in service. Moreover, the method is only for transferring UEs within the same pool area. In addition, the method is limited to 2G or 3G networks, and is inapplicable to other networks like evolved networks, networks where both evolved networks and UMTS networks coexist, or post-SAE networks.

Currently, in the evolved network, in Section 7.13 of 3GPP protocol TR23.882-130, a reattaching method is provided to transfer a UE from a source MME/UPE to a target MME/UPE. As shown in FIG. 6, the involved network entities include a UE, an evolved access network (eRAN), a target MME/UPE, a source MME/UPE, an inter access system anchor (IASA), and a home subscriber server (HSS). The method includes the following steps.

In Step 601, due to factors such as overload, routes not being optimized, or the reception of an operation and maintenance (O&M) request, the source MME/UPE sends a reattach request to the UE.

In Step 602, the UE finds a selectable evolved network access system through the interaction with the eRAN, and selects the access system and network.

In Step 603, the UE sends an attach request to the selected target MME/UPE, and the request carries the registration information of the UE such as packet temporary mobile subscriber identity (P-TMSI). If the UE does not store the registration information, the request carries a permanent user ID.

As the network is shared, the attach request carries the information of the selected target MME/UPE, and the eRAN selects the target MME/UPE. The attach request may also carry information about default IP access bearer, for example, the IP address and access point name (APN) selected by the UE.

In Step 604, on receiving the attach request, if the request carries the registration information of the UE, the target MME/UPE determines the source MME/UPE according to the P-TMSI, and sends a message for obtaining a UE-related user information to the source MME/UPE.

In Step 605, the source MME/UPE sends the UE-related user information, for example, permanent user information, to the target MME/UPE.

In Step 606, the target MME/UPE authenticates the UE through the HSS.

In Step 607, the target MME/UPE sends a registration message to the HSS, indicating that the target MME/UPE is serving the UE.

In Step 608, the HSS indicates the source MME/UPE to delete the stored UE-related user information or to identify the absence of the UE.

In Step 609, the HSS sends a registration acknowledge message to the target MME/UPE. Meanwhile, user subscription data authorized to the default IP access bearer is sent at the same time, and strategy charging control information of the default IP access bearer is also sent to the target MME/UPE at the same time.

In Step 610, the target MME/UPE selects the IASA.

In Step 611, the IASA configures an IP layer with the confirmed IP address of the UE, so that a new user plane is established, and a default strategy charging rule is adopted to charge the UE.

In Step 612, the target MME/UPE provides the eRAN with an allocation of quality of service (QoS) of the default IP access bearer, for example, an upper limit of the data transmission rate.

In Step 613, the target MME/UPE accepts the attach request of the UE, allocates the P-TMSI to the UE, and sends to the UE an attached acknowledge message carrying the confirmed IP address of the UE.

In Step 614, the UE sends the attached acknowledge message to the target MME/UPE.

The method illustrated in FIG. 6 is only applicable to an evolved network, and does not specify how to transfer a UE between CN entities in a UMTS network or in the case when a UMTS network and an evolved network coexist. FIG. 6 also reveals a flaw that the access network may pick up the source CN element when selecting a CN element if no preventive measure is taken.

SUMMARY OF THE INVENTION

Accordingly, embodiments of the disclosure are directed to a method and system for transferring a UE in a mobile communication system. The method and system are widely applied, and the transferring is initiated by a network side element. Besides, a more preferable CN element is selected as the target CN element according to a certain mechanism, so as to provide a better service for the user of the UE.

In order to achieve the above objective, the embodiments of the disclosure provide the following solutions.

In a first aspect of the invention, a method is provided for transferring user equipment (UE) in a mobile communication system. The method comprises:

receiving, by a UE, a transfer instruction carrying UE transfer restriction information from a source core network (CN) element serving the UE, wherein the UE transfer restriction information comprises information for transferring the UE to a target CN element that is different from the source CN element; and sending, by the UE, a transfer request to an access network entity based on the received transfer instruction.

The transfer request comprises information for the access network entity to select a target CN element that is different from the source CN element, and to transfer the UE to the target CN element.

In a second aspect of the invention, a user equipment (UE) is provided. The UE, comprises:

a receiver, configured to receive a transfer instruction carrying UE transfer restriction information from a source core network (CN) element serving the UE, wherein the UE transfer restriction information comprises information for transferring the UE to a target CN element that is different from the source CN element; and a processor, configured to prepare a transfer request based on the received transfer instruction, wherein the transfer request comprises information for the access network entity to select a target CN element that is different from the source CN element, and to transfer the UE to the target CN element; and a transmitter, configured to send the transfer request to an access network entity.

In a third aspect of the invention, a mobile communication system is provided. The system comprises:

a user equipment (UE), configured to receive a transfer instruction carrying UE transfer restriction information from a source core network (CN) element serving the UE, wherein the UE transfer restriction information comprises information for transferring the UE to a target CN element that is different from the source CN element; and send a transfer request to an access network entity based on the received transfer instruction; and the access network entity, configured to receive the transfer request sent by the UE, select a target CN element that is different from the source CN element for the UE according to the transfer request, and transfer the UE to the target CN element.

DETAILED DESCRIPTION

In order to make the aforementioned objectives, technical solutions and advantages of some embodiments of the disclosure more comprehensible, examples accompanied with figures are described in detail below.

Figure 7:
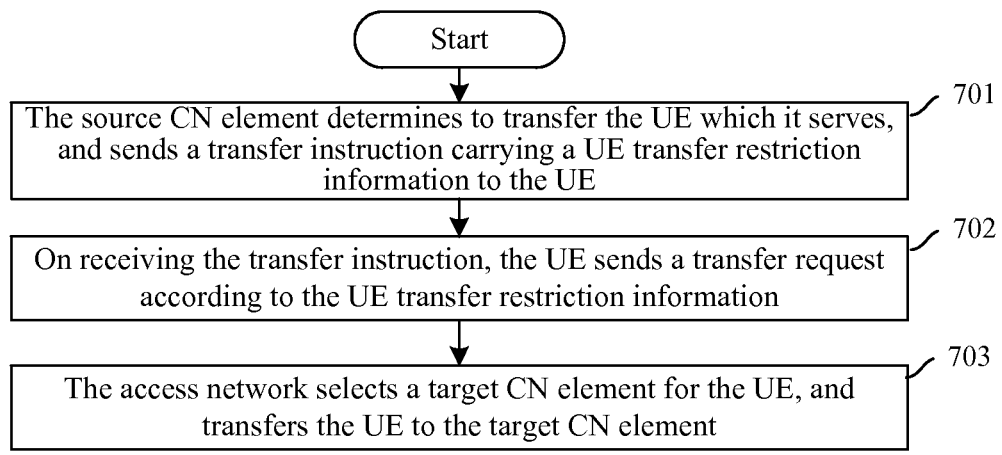
FIG. 7 is a flow chart of a method for transferring a UE in a mobile communication system according to an embodiment of the disclosure.

In order to provide a user of a UE with better services, an embodiment of the disclosure provides a method in which a network side element initiates a UE transferring in a mobile communication system. The method is aimed at selecting more satisfactory service CN entities for the user according to a certain mechanism. The detailed process is shown in FIG. 7. Referring to FIG. 7, the involved network entities include a source CN element, a target CN element, an access network and a UE. The method includes the following steps.

In Step 701, the source CN element determines to transfer a UE which it serves, and sends a transfer instruction carrying UE transfer restriction information to the UE.

In Step 702, on receiving the transfer instruction, the UE sends a transfer request according to the UE transfer restriction information carried in the instruction.

In Step 703, the access network selects a target CN element for the UE; and the UE is transferred to the target CN element. The target CN element is a CN element that is different from the source CN element.

As can be seen from the above solution, in the embodiment of the disclosure, the network side of the mobile communication system initiates the UE transferring between the CN entities. The embodiment may be widely applied in existing networks as well as future networks, such as the evolved network, universal mobile telecommunication system (UMTS) network, network in which the UMTS network and the evolved network coexist, and even post-SAE network or coexistence network in other forms.

In Step 703, the access network has many ways to select the target CN element, which will be illustrated in detail below.

In some embodiments of the disclosure, the UE can be transferred in two modes. One mode is to implement the transferring through a location area update (LAU) technique, and the other is to implement the transferring through an attach technique. The two modes are illustrated as follows.

In the first mode, the UE is transferred through an LAU technique.

An LAU process is specified in the UMTS network and the evolved network. The process is called RAU in the UMTS network while TAU in the evolved network. The LAU includes, but is not limited to, the RAU and TAU. For ease of illustration, the RAU is taken as an example below.

In some embodiments of the disclosure, in order to enable the network side of the mobile communication system to transfer the UE based on the RAU technique, a message is required to indicate the UE to perform the RAU process. In some aspects, a particular message or an information equipment (IE) in an existing message carrying the RAU instruction is sent to the UE to indicate the UE to perform the RAU process. For example, the network side of the mobile communication system indicates the UE to perform the RAU process by sending an RAU instruction thereto, or by carrying an IE having the RAU instruction in a paging message when paging the UE.

When sending the RAU instruction to the UE, the source CN element may also set a timer indicating the UE to send an RAU request after the timer experiences a time-out, so that the RAU request is sent after the interface between the element and the CN in the access network is released. Definitely, the timer is optional, and the RAU request may be immediately sent after the UE receives the RAU instruction.

The method for transferring a UE based on the RAU technique provided by the embodiment may be widely applied to various networks, instead of being limited to the UMTS network. That is, the method is also applicable to the evolved network, the network where the evolved network and the UMTS network coexist, and even the post-evolved network as well as coexistence network in other forms. The method of transferring a UE by CN entities provided in the embodiments of the disclosure is applicable to not only processes in which the user transferring is initiated by entities such as a serving GPRS support node (SGSN), MME, and UPE, but also processes of the above adaptable networks in which the user transferring is initiated by CN entities. For example, the method is applicable to a process in which a user transferring to other CN entities is initiated by CN entities in an OMC, gateway GPRS support node (GGSN), IASA, or even post-SAE network.

Compared with the method for transferring a UE based on the attach technique, the UE transferring based on the RAU technique is advantageous in that the target CN element does not need to reconstruct the context and thus the UE services may not be interrupted. In the UE transferring based on the RAU technique, the target CN element requests the source CN element for the context of the UE instead of reconstructing the UE context, and will not delete the activated context of the packet data protocol (PDP) as in the attach process, so as to ensure the continuity of the UE services. For example, when browsing a web page, the UE performs no operation for quite a long time. Though the mobility management state of the UE is idle, the session management state is active, and at this point, if the network side of the mobile communication system initiates a reattach process to transfer the UE, the CN element will clear the stored context of the UE, thus resulting in a termination of the current session of the UE. However, the UE transferring based on the RAU technique does not have the above problem. In addition, if the UE transferring is implemented by setting certain flag bits or sending other messages instead of using the LAU technique, the context of the source CN element may not be deleted during the user transferring process, and the target CN element obtains the context of the UE from the source CN element, thus ensuring the service continuity. The method also fulfills the purpose of the embodiments of the disclosure. Though different in form, the method is substantially the same as the above embodiment of the disclosure, thus falling in the protecting range of the disclosure.

Figure 8:
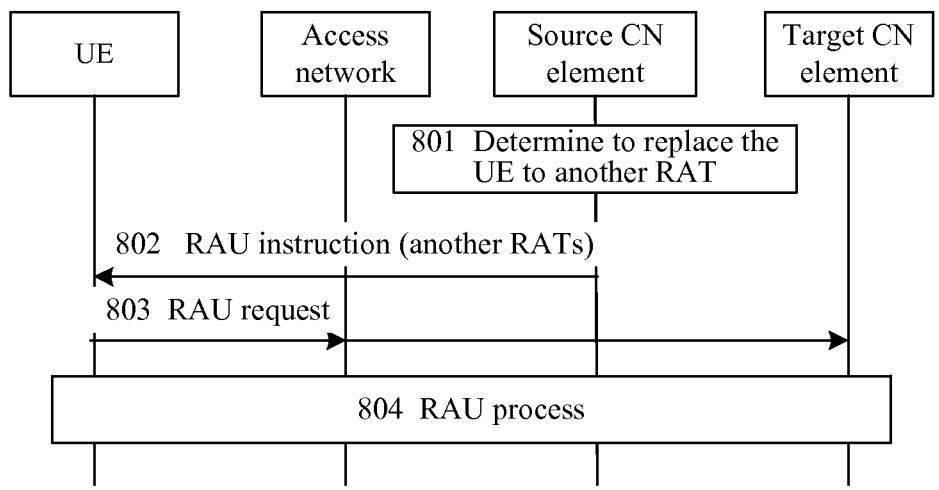
FIG. 8 is a flow chart of a first method for transferring a UE triggered by the network side based on an RAU technique according to an embodiment of the disclosure.

FIG. 8 is a flow chart of a first method for transferring a UE triggered by the network side based on the RAU technique according to an embodiment of the disclosure. The method includes the following steps.

In Step 801, the source CN element determines to change a Radio Access Technique (RAT) for a UE it serves due to factors such as overload, service requirements, or the reception of an O&M request.

In Step 802, the source CN element sends an RAU instruction to the UE, indicating the UE to be transferred to another RAT.

The RAT information carried in the transfer instruction may be information for preventing the access of the UE to the original RAT, or one or more RATs selected by the source CN element for the UE. In the latter case, the candidate RATs are arranged in priority order and sent to the UE in the form of an RAT list, so that the UE selects the RAT accordingly.

In Step 803, the UE selects an RAT according to the RAT information carried in the received RAU instruction, and sends an RAU request in the RAT. According to a set mechanism, for example, load sharing, the access network selects a target CN element for the UE and sends the RAU request to the target CN element.

In Step 804, an RAU process is implemented between the UE and the network.

When the UE is transferred to another RAT, the access network equipment needs to be switched. For example, when the UE is transferred from the UMTS network to the evolved network, the access network equipment changes from the RAN of the original 2G/3G network into the eRAN of the evolved network, and both the RAN and eRAN are represented by the access network in FIG. 8.

The method of FIG. 8 is applicable to the circumstance of transferring the RAT for the UE. For example, the first, due to the overload of one CN element in the network where the UMTS network and the evolved network coexist, the UE has to be transferred to another CN element with a lighter load. The second, the RAT is transferred for the UE on receiving an O&M request. The third, due to service requirements, for example, when downstream data with higher QoS is sent to the UE attached to the SGSN, the UMTS network currently serving the UE is unsatisfactory while the evolved network can meet the requirement, so that the UE has to be transferred to the evolved network.

Figure 9:
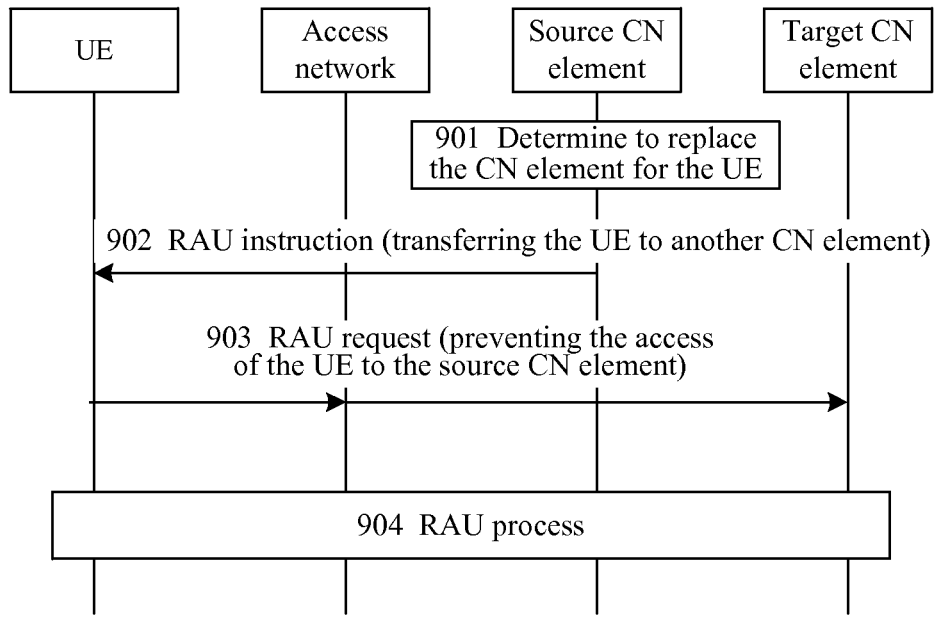
FIG. 9 is a flow chart of a second method for transferring a UE triggered by the network side based on the RAU technique according to an embodiment of the disclosure.

FIG. 9 is a flow chart of a second method for transferring a UE triggered by the network side based on the RAU technique according to an embodiment of the disclosure. The method includes the following steps.

In Step 901, the source CN element determines to transfer the CN element for a UE it serves.

In Step 902, the source CN element sends an RAU instruction to the UE, indicating the UE to be transferred to another CN element.

In Step 903, on receiving the RAU instruction, the UE sends an RAU request carrying information for preventing the access of the RAU to the source CN element. According to the restriction information carried by the received RAU request, the access network adopts a set mechanism, for example, load sharing, to select the target CN element for the UE, and forwards the RAU request to the target CN element.

In Step 904, an RAU process is implemented between the UE and the network.

The method of FIG. 9 may be generally adopted and widely applied to various circumstances, for example, in the case of an overload of the CN element that serves the UE, an O&M request, or routes not being optimized. In the method, the source CN element and the target CN element can belong to the same network or to different networks.

Figure 10:
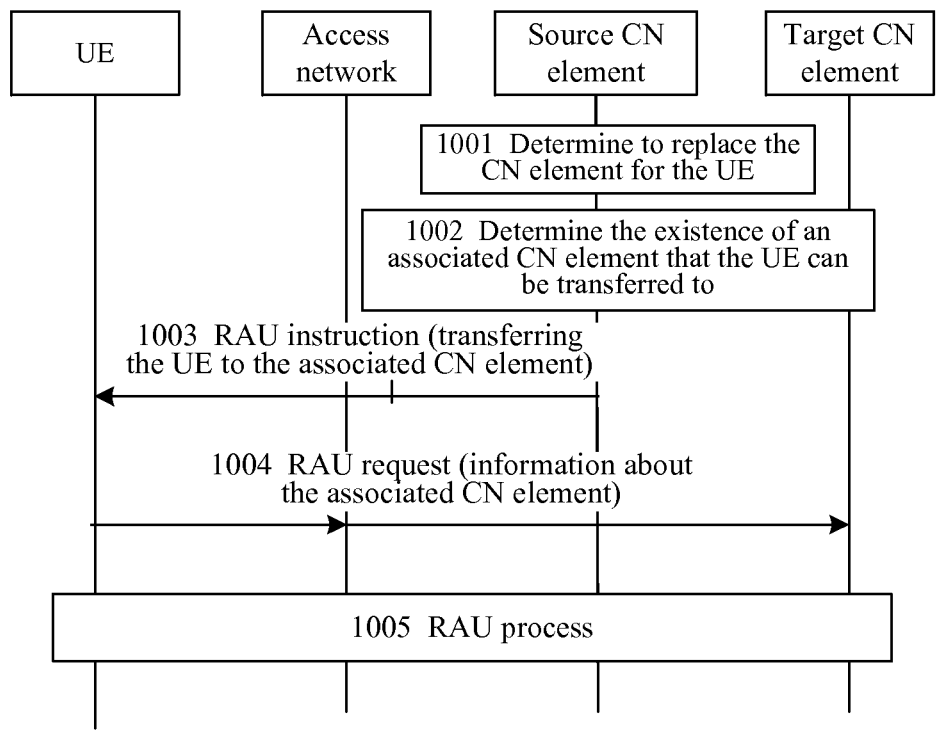
FIG. 10 is a flow chart of a third method for transferring a UE triggered by the network side based on the RAU technique according to an embodiment of the disclosure.

FIG. 10 is a flow chart of a third method for transferring a UE triggered by the network side based on the RAU technique according to an embodiment of the disclosure. The method includes the following steps.

In Step 1001, the source CN element determines to transfer the CN element for the UE.

In Step 1002, as for the UE to be transferred, the source CN element determines it has an associated CN element and the UE can be transferred to the associated CN element.

In Step 1003, the source CN element sends an RAU instruction to the UE, indicating the UE to be transferred to the associated CN element.

In Step 1004, the UE sends an RAU request carrying an ID related to the associated CN element. According to the ID related to the associated CN element carried by the request, the access network sends the RAU request to the associated CN element. The ID related to the associated CN element may be any identity capable of uniquely determining the associated CN element, for example, the identity of the associated CN element, the NRI of the associated CN element, or the TMSI allocated by the associated CN element to the UE.

In Step 1005, an RAU process is implemented between the UE and the network.

The method of FIG. 10 is applicable to the circumstance that the UE is simultaneously attached to two CN entities associated with each other, and selects a network to reside in. For example, due to the overload of one CN element, the UE has to be transferred to the other CN element; or due to service requirements, when downstream data with high QoS is sent to the UE residing in the SGSN, the UMTS network is unsatisfactory while the evolved network can meet the requirement, so that the UE needs to be transferred to the MME/UPE of the associated evolved network.

Figure 11:
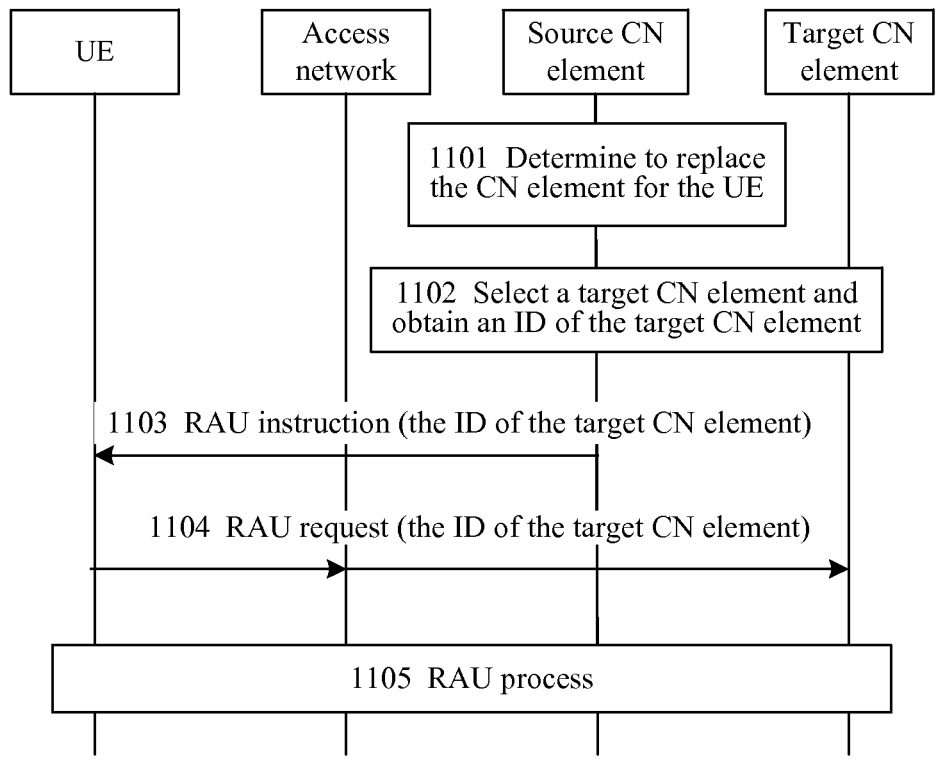
FIG. 11 is a flow chart of a fourth method for transferring a UE triggered by the network side based on the RAU technique according to an embodiment of the disclosure.

FIG. 11 is a flow chart of a fourth method for transferring a UE triggered by the network side based on the RAU technique according to an embodiment of the disclosure. The method includes the following steps.

In Step 1101, the source CN element determines to transfer the CN element for a UE.

In Step 1102, according to a set mechanism, for example, load sharing, the source CN element selects a target CN element with a lighter load from CN entities that share the same interface with the source CN element, and obtains an ID related to the target CN element.

The ID related to the target CN element may be any identity capable of uniquely determining the element, for example, the identity of the target CN element, the NRI of the target CN element, or the TMSI allocated by the target CN element to the UE. The TMSI is allocated by the CN to the UE. For example, the TMSI is U-TMSI in the UMTI network and S-TMSI in the evolved network.

In Step 1103, the source CN element sends an RAU instruction carrying the ID related to the target CN element to the UE.

In Step 1104, on receiving the RAU instruction, the UE sends an RAU request carrying the ID related to the target CN element. The access network receives and forwards the RAU request to the target CN element according to the ID related to the target CN element carried in the request.

In Step 1105, an RAU process is implemented between the UE and the network.

The method of FIG. 11 is applicable to a circumstance that the source CN element obtains a target CN element for the UE according to a set mechanism. For example, when the source CN element is overloaded, another CN element is selected for the UE within the same pool area. When the route is not optimized, another CN element with a more preferred route is selected for the UE. In case of an O&M operation, for example, an operation and maintenance centre (OMC) determines that part of the UEs on the SGSN element have to be transferred to the MME/UPE element, so that the OMC interacts with the MME/UPE element to obtain a related ID, then issues an O&M command to the SGSN element for transferring some UEs, and notifies the SGSN element of an ID related to the target MME/UPE element, and the SGSN element, on receiving the command, sends an RAU instruction to the UE. Due to service requirements, for example, when downstream data with high QoS is sent to the UE residing in the SGSN element, the UMTS network is unsatisfactory while the SGSN element may obtain an MME/UPE element capable of receiving the UE transferred thereto from the evolved network sharing the same interface with the element, and the MME/UPE element can meet the QoS requirement, the method may be adopted to transfer the UE to the MME/UPE element.

In the method of FIG. 11, the target CN element may be an associated CN element related to the source CN element of the UE, which is a special case of FIG. 10. In the method, the source CN element and the target CN element can belong to the same network or to different networks.

Figure 12:
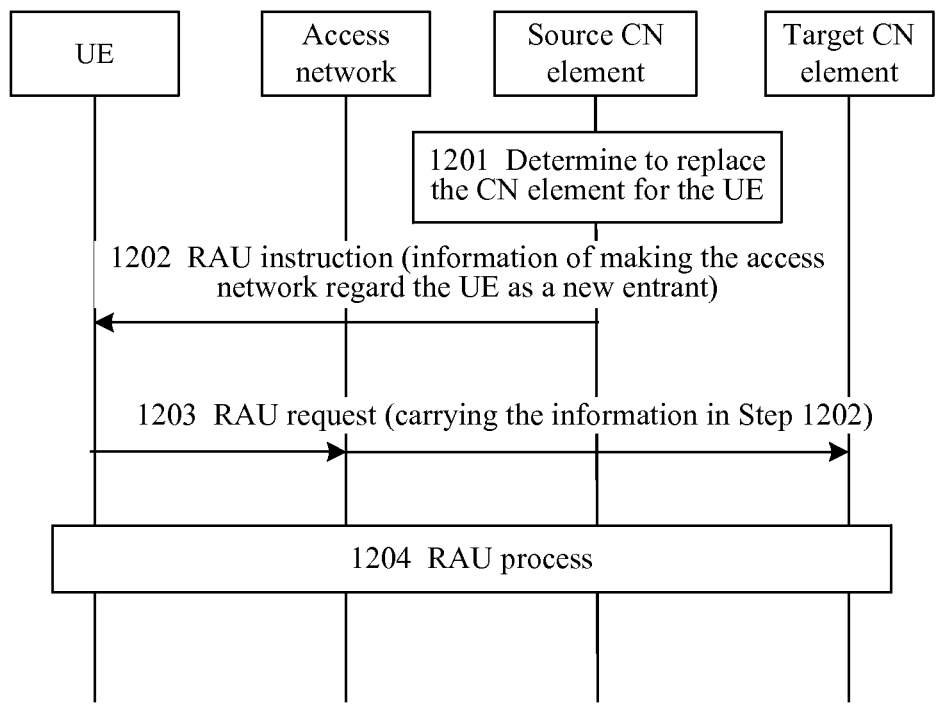
FIG. 12 is a flow chart of a fifth method for transferring a UE triggered by the network side based on the RAU technique according to an embodiment of the disclosure.

FIG. 12 is a flow chart of a fifth method for transferring a UE triggered by the network side based on the RAU technique according to an embodiment of the disclosure. The method includes the following steps.

In Step 1201, the source CN element determines to transfer the CN element for a UE.

In Step 1202, the source CN element sends an RAU instruction to the UE, indicating the UE to adopt an ID that makes the access network regard the UE as a new entrant to send an RAU request.

When the indicated UE accesses again, the ID that makes the access network regard the UE as a new entrant UE has various types, for example, a TMSI which is set as Null, a TMSI with an NRI field set as Null, or IDs of CN entities other than those currently within the area of the UE. In the latter two cases, the ID has to be generated at the source CN element. In the case that the TMSI is set as Null, the source CN element sends a related instruction to the UE.

In Step 1203, the UE sends an RAU request carrying the ID indicated in Step 1202. The access network receives the message, and determines the UE as a new entrant according to the ID carried in the message. Therefore, the access network adopts a set mechanism, for example, load sharing, to select the target CN element and then send the RAU request to the target CN element.

In Step 1204, an RAU process is implemented between the UE and the network.

In Step 1203 of FIG. 12, the ID indicated in Step 1202 serves as an IE in a radio resource control (RRC) field of the RAU request, but the ID does not need to serve as an IE in a non-access stratum (NAS) field of the RAU request.

The method of FIG. 12 is applicable to a circumstance that the source CN element is overloaded and the UE has to be transferred to a CN element with a lighter load. In the method, the source CN element and the target CN element can belong to the same network or to different networks.

Figure 13:
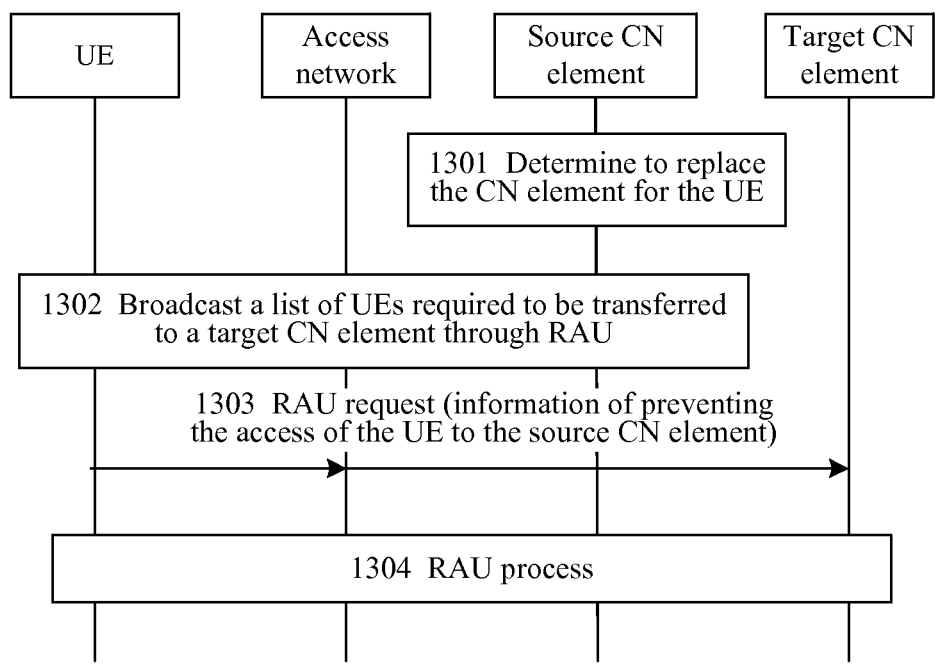
FIG. 13 is a flow chart of a sixth method for transferring a UE triggered by the network side based on the RAU technique according to an embodiment of the disclosure.

FIG. 13 is a flow chart of a sixth method for transferring a UE triggered by the network side based on the RAU technique according to an embodiment of the disclosure. The method includes the following steps.

In Step 1301, the source CN element determines to transfer the CN element for a UE.

In Step 1302, the source CN element broadcasts a list of UEs required to be transferred to other CNs based on RAU, and meanwhile broadcasts information that prevents the access of the UEs to the source CN element.

In Step 1303, the UE monitors a broadcast message and determines whether the UE itself is arranged in the broadcast list. If the UE itself is arranged in the broadcast list, the UE sends an RAU request carrying the information that prevents its access to the source CN element. According to the information carried in the received request, the access network adopts a set mechanism, for example, load sharing, to select the target CN element for the UE and send the RAU request to the target CN element.

In Step 1304, an RAU process is implemented between the UE and the network.

The method of FIG. 13 is applicable to circumstances that the source CN element is overloaded, in case of an O&M operation, and the CN element is to be shut down for maintenance or upgrade. In the method, the source CN element and the target CN element can belong to the same network or to different networks.

Several embodiments are given below to further illustrate certain aspects of the disclosure.

Figure 14:
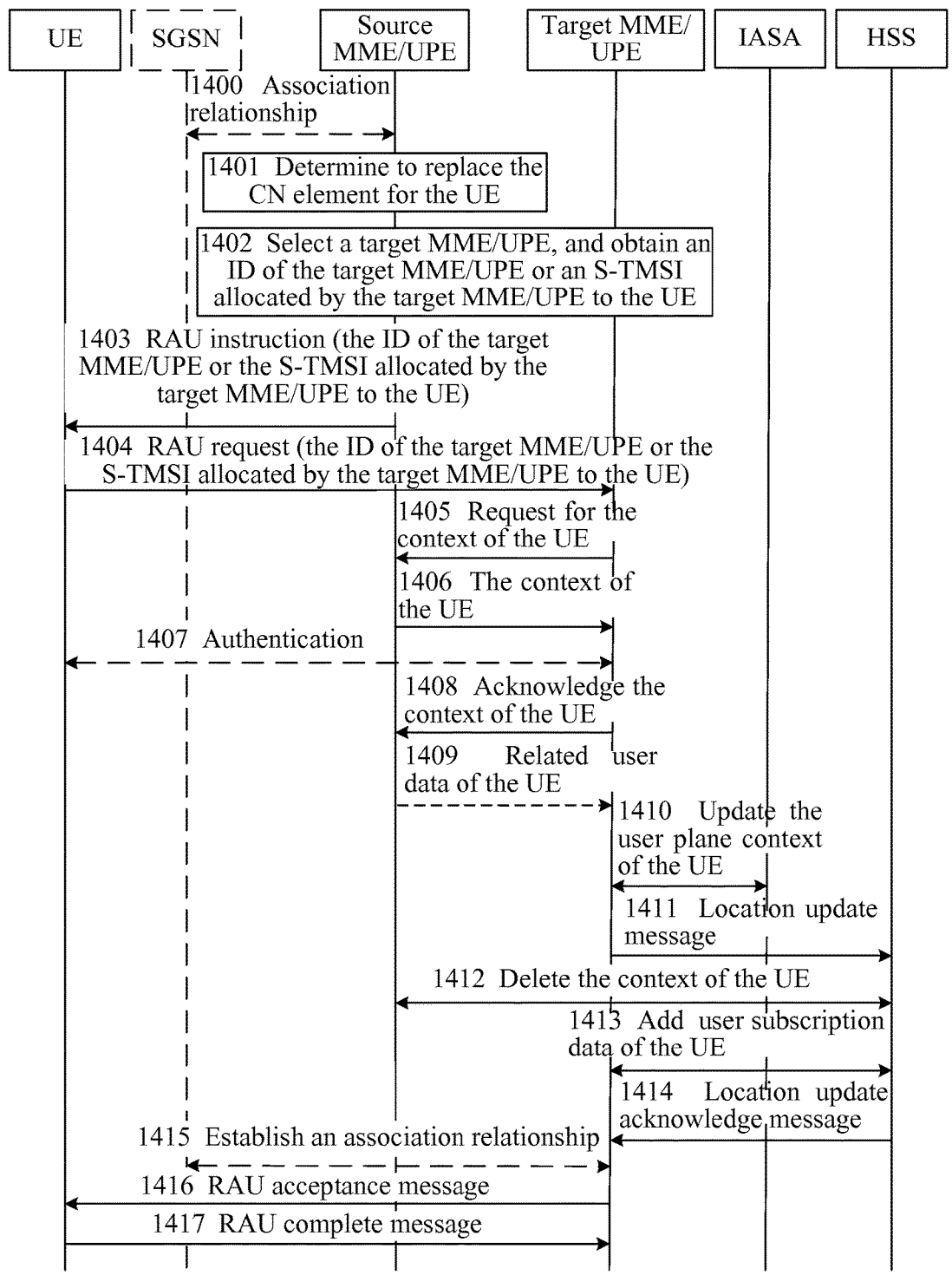
FIG. 14 is a flow chart of UE transferring between CN entities in an evolved network triggered by the network side based on the RAU technique according to an embodiment of the disclosure.

FIG. 14 is a flow chart of UE transferring between CN entities in an evolved network triggered by the network side based on the RAU technique according to an embodiment of the disclosure. When getting overloaded, the source MME/UPE element detects that another MME/UPE element sharing the same interface bears a lighter load, and thus adopts the method. The method includes the following steps.

Optionally, in Step 1400, the SGSN element is associated with the Source MME/UPE element. In Step 1401, the source MME/UPE element determines to replace the CN element for a UE.

In Step 1402, according to a load sharing mechanism, the source MME/UPE element selects an MME/UPE element with a lighter load from MME/UPE entities that share the same interface with the source MME/UPE element as a target MME/UPE element, and obtains an ID of the target MME/UPE element or an S-TMSI allocated by the target MME/UPE element to the UE.

In Step 1403, the source MME/UPE element sends the UE an RAU instruction carrying the ID of the target MME/UPE element or the S-TMSI allocated by the target MME/UPE element to the UE.

In Step 1404, the UE sends an RAU request carrying the ID of the target MME/UPE element or the S-TMSI allocated by the target MME/UPE element to the UE via the access network. The access network determines the target MME/UPE element according to the information carried in the RAU request, and forwards the RAU request to the target MME/UPE element.

In Step 1405, the target MME/UPE element requests the source MME/UPE element for a related context of the UE.

In Step 1406, the source MME/UPE element returns the related context of the UE to the target MME/UPE element.

In Step 1407, the target MME/UPE element authenticates the UE.

In Step 1408, the target MME/UPE element replies a context acknowledge message to the source MME/UPE element.

In Step 1409, the source MME/UPE element sends related user data of the UE to the target MME/UPE element. This step is optional.

In Step 1410, a default IP bearer between the target MME/UPE element and the IASA is updated, and the message adopted may be, but is not limited to, a PDP context update request/response.

In Step 1411, the target MME/UPE element sends a location update message to the HSS, and the message may be, but is not limited to, Update Location.

In Step 1412, the HSS deletes the related context of the UE from the source MME/UPE element.

In Step 1413, the HSS adds UE subscription data into the target MME/UPE element.

In Step 1414, the HSS sends a location update acknowledge message to the target MME/UPE element, and the message may be, but is not limited to, Update Location Ack.

In Step 1415, if the UE is attached to a UMTS network at the same time, an association relationship is built between the target MME/UPE element and the SGSN element in the UMTS network. This step is optional.

In Step 1416, the target MME/UPE element sends an RAU acceptance message to the UE, and if the TMSI/RA changes, this information is also carried in the acceptance message.

In Step 1417, the UE sends an RAU complete message to the target MME/UPE element.

When the source MME/UPE needs to be shut down for operation maintenance or the route is not optimized due to the motion of the UE, the above process can be employed to perform user transferring in the SAE network. However, the mechanism of selecting the target MME/UPE element may be different. For example, when the source MME/UPE needs to be shut down for maintenance, the OMC determines the UE to be transferred, selects the target MME/UPE element for the UE, and notifies the source MME/UPE to send an RAU instruction to the UE via an O&M command. If the route of the UE is not optimized, the source MME/UPE selects a target MME/UPE with an optimized route for the UE.

Figure 15:
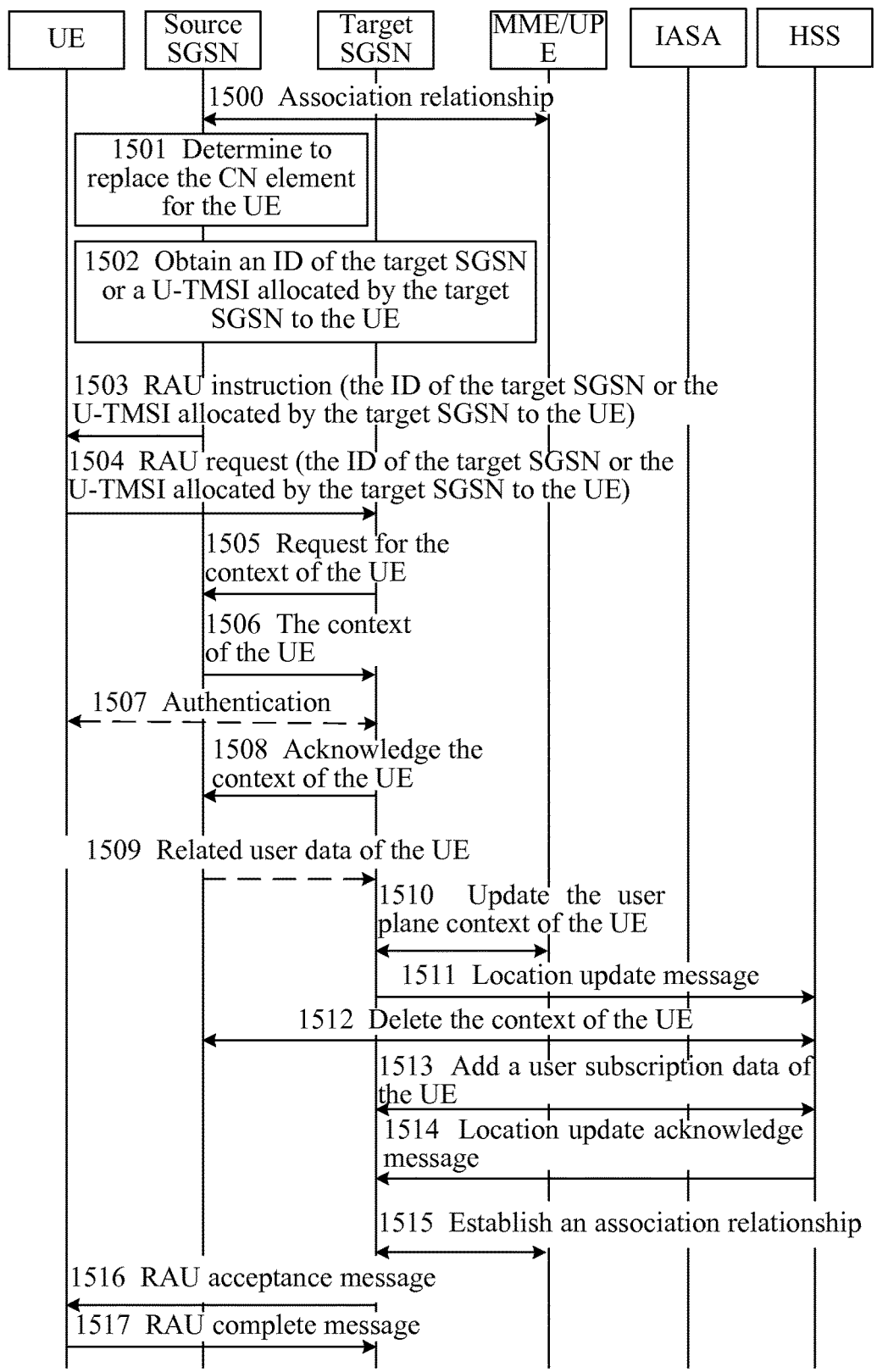
FIG. 15 is a flow chart of UE transferring between CN entities in a UMTS network triggered by the network side based on the RAU technique according to an embodiment of the disclosure.

FIG. 15 is a flow chart of UE transferring between CN entities in a UMTS network triggered by the network side based on the RAU technique according to an embodiment of the disclosure. The UE is attached to the SGSN element and the MME/UPE element at the same time, and an association relationship is built between the SGSN element and the MME/UPE element. When the source SGSN element is overloaded and the associated MME/UPE element is incapable of receiving the UE transferred due to overload or routes not being optimized to the UE, the source SGSN element selects an SGSN element with a lighter load from those sharing the same interface for UE transferring. The method includes the following steps.

In Step 1500, the source SGSN element is associated with the target MME/UPE element.

In Step 1501, the source SGSN element determines to replace the CN element for a UE.

In Step 1502, the source SGSN element obtains an ID of the target SGSN element or a U-TMSI allocated by the target SGSN element to the UE.

In Step 1503, the source SGSN element sends the UE an RAU instruction carrying the ID of the target SGSN element or the U-TMSI allocated by the target SGSN element to the UE.

In Step 1504, the UE sends an RAU request carrying the ID of the target SGSN element or the U-TMSI allocated by the target SGSN element to the UE via the access network. The access network determines the target SGSN element according to the information carried in the RAU request, and forwards the RAU request to the target SGSN element.

In Step 1505, the target SGSN element requests the source SGSN element for a related context of the UE.

In Step 1506, the source SGSN element returns the related context of the UE to the target SGSN element.

In Step 1507, the target SGSN element authenticates the UE. This step is optional.

In Step 1508, the target SGSN element replies a context acknowledge message to the source SGSN element.

In Step 1509, the source SGSN element sends related user data of the UE to the target SGSN element. This step is optional.

In Step 1510, a default IP bearer between the target SGSN element and the MME/UPE is updated, and the message adopted may be, but is not limited to, a PDP context update request/response.

In Step 1511, the target SGSN element sends a location update message to the HSS, and the message may be, but is not limited to, Update Location.

In Step 1512, the HSS deletes the related context of the UE from the source SGSN element.

In Step 1513, the HSS adds UE subscription data into the target SGSN element.

In Step 1514, the HSS sends a location update acknowledge message to the target SGSN element, and the message may be, but is not limited to, Update Location Ack.

In Step 1515, an association relationship is built between the target SGSN element and the MME/UPE element in the evolved network.

In Step 1516, the target SGSN element sends an RAU acceptance message to the UE, and if the TMSI/RA changes, this information is also carried in the acceptance message.

In Step 1517, the UE sends an RAU complete message to the target SGSN element.

Figure 1:
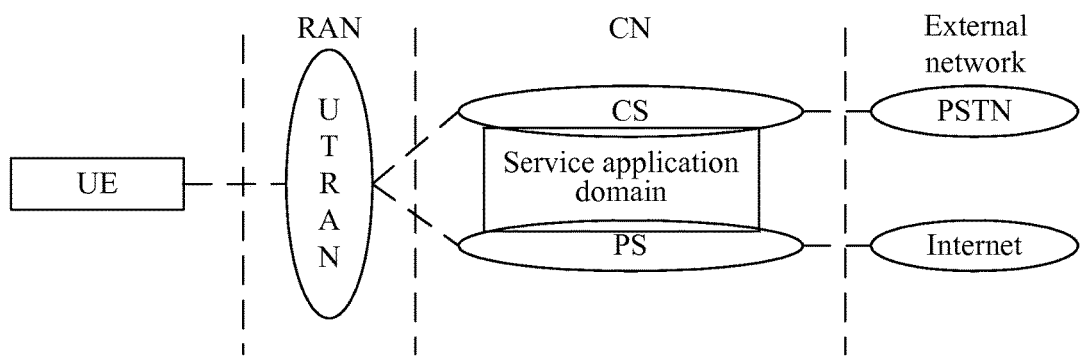
FIG. 1 is a schematic structural view of a UMTS.
Figure 2:
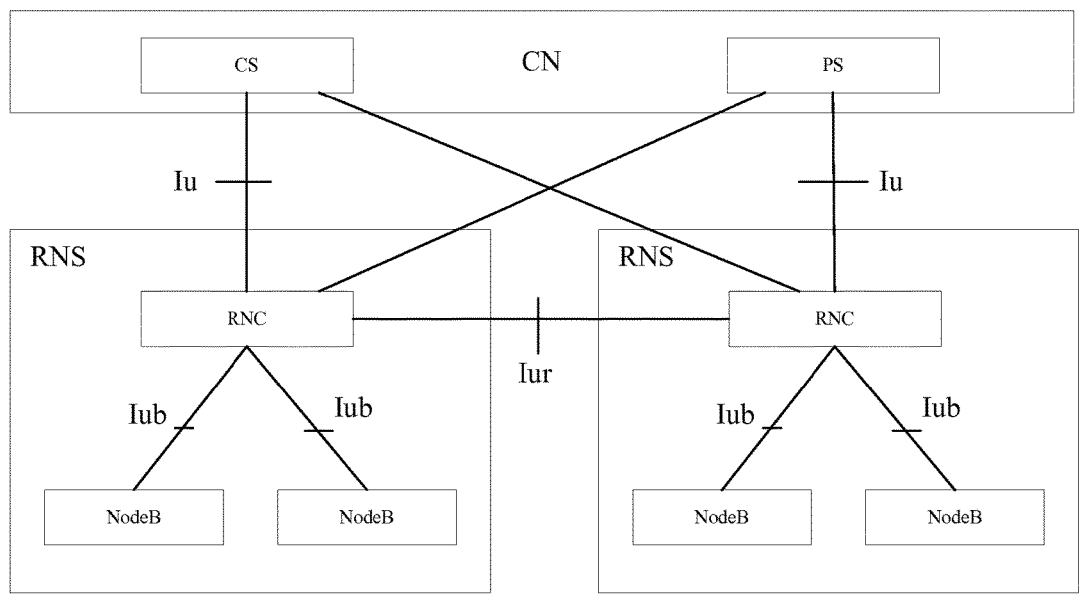
FIG. 2 is a schematic structural view of a UTRAN.
Figure 3:
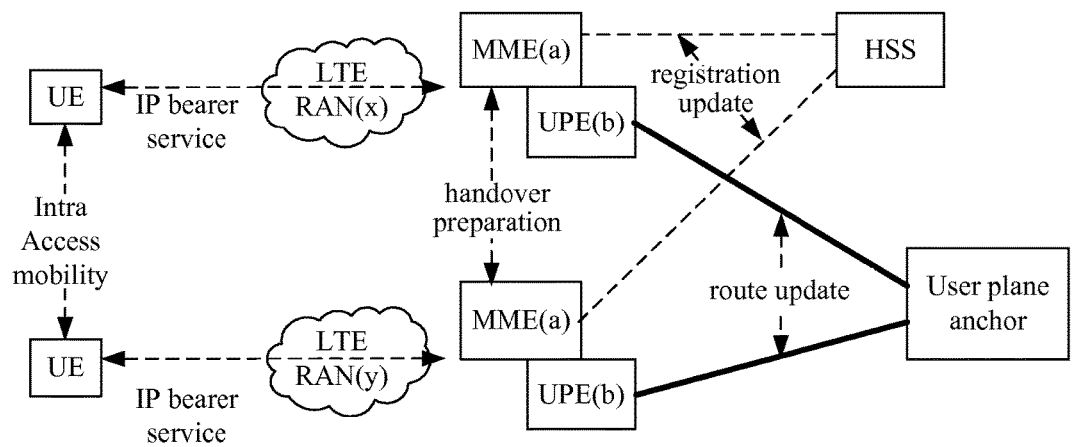
FIG. 3 is a schematic architectural view of an evolved network.
Figure 4:
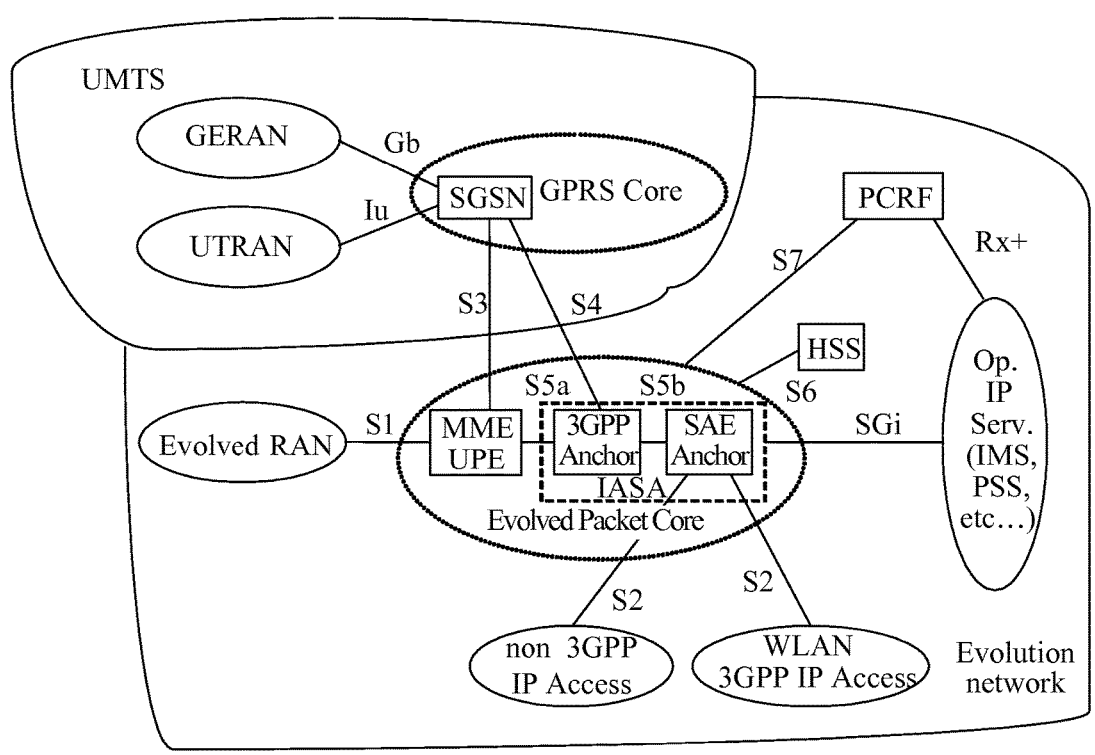
FIG. 4 is a schematic architectural view of a network where a UMTS network and an evolved network coexist.
Figure 5:
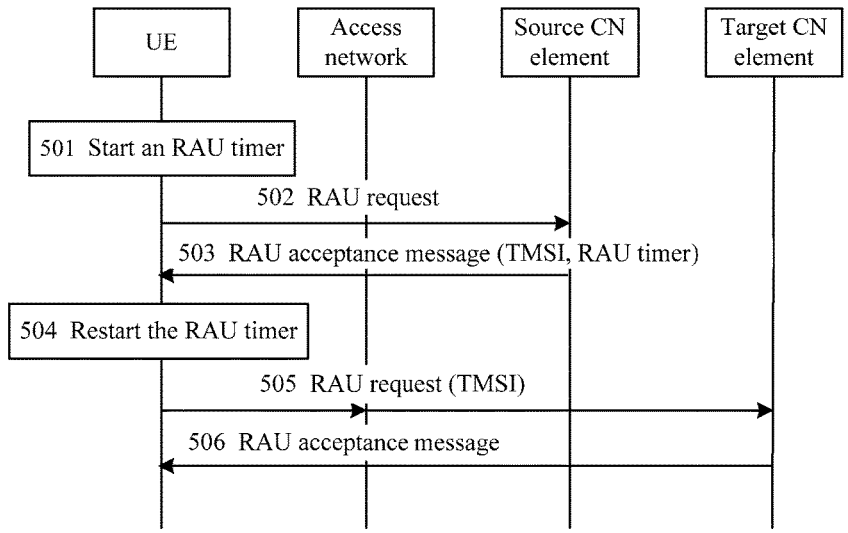
FIG. 5 is a flow chart of a process for transferring all the UEs of a source CN element to another CN element in a 3G or 2G network.
Figure 6:
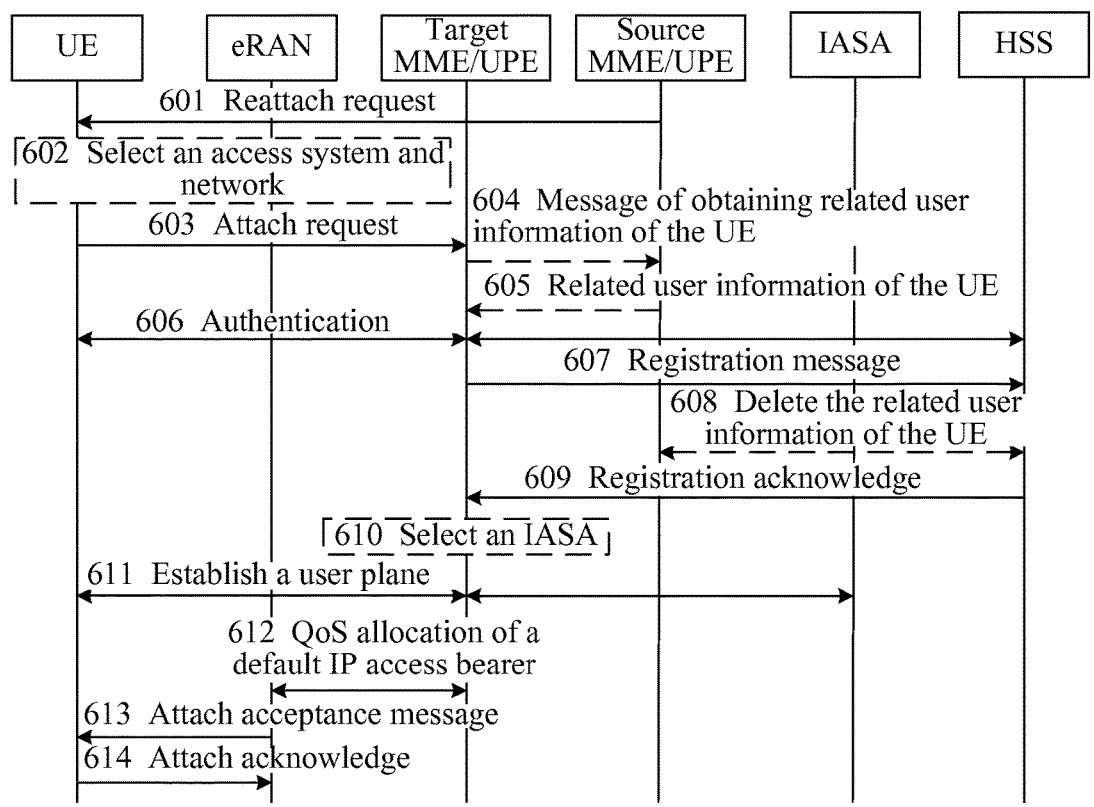
FIG. 6 is a flow chart of transferring a UE from a current MME/UPE to another MME/UPE by a reattach method in an evolved network.

In FIG. 15, the UPE is located on a data path of the 2G/3G network, i.e., user plane data is transmitted between the SGSN element, UPE element, and IASA element via the S3 interface in FIG. 3. Thus, the update of the user plane context in Step 1510 is performed between the target SGSN element and the MME/UPE element. If the user plane data is transmitted between the SGSN element and the IASA element via the S4 interface in FIG. 3, the update of the user plane context of the UE in Step 1510 is performed between the target SGSN element and the IASA element.

When the source SGSN element needs to be shut down for operation maintenance or the route is not optimized due to the motion of the UE, the method of FIG. 15 can be employed to transfer the UE between CN entities in the UMTS network. However, the mechanism of selecting the target SGSN element may be different. For example, when the source SGSN element needs to be shut down for maintenance, the OMC determines whether the UE needs to be transferred, selects the target SGSN element for the UE, and notifies the source SGSN element to send an RAU instruction to the UE via an O&M command. If the route of the UE is not optimized, the source SGSN element selects a target SGSN element with an optimized route for the UE.

Figure 16:
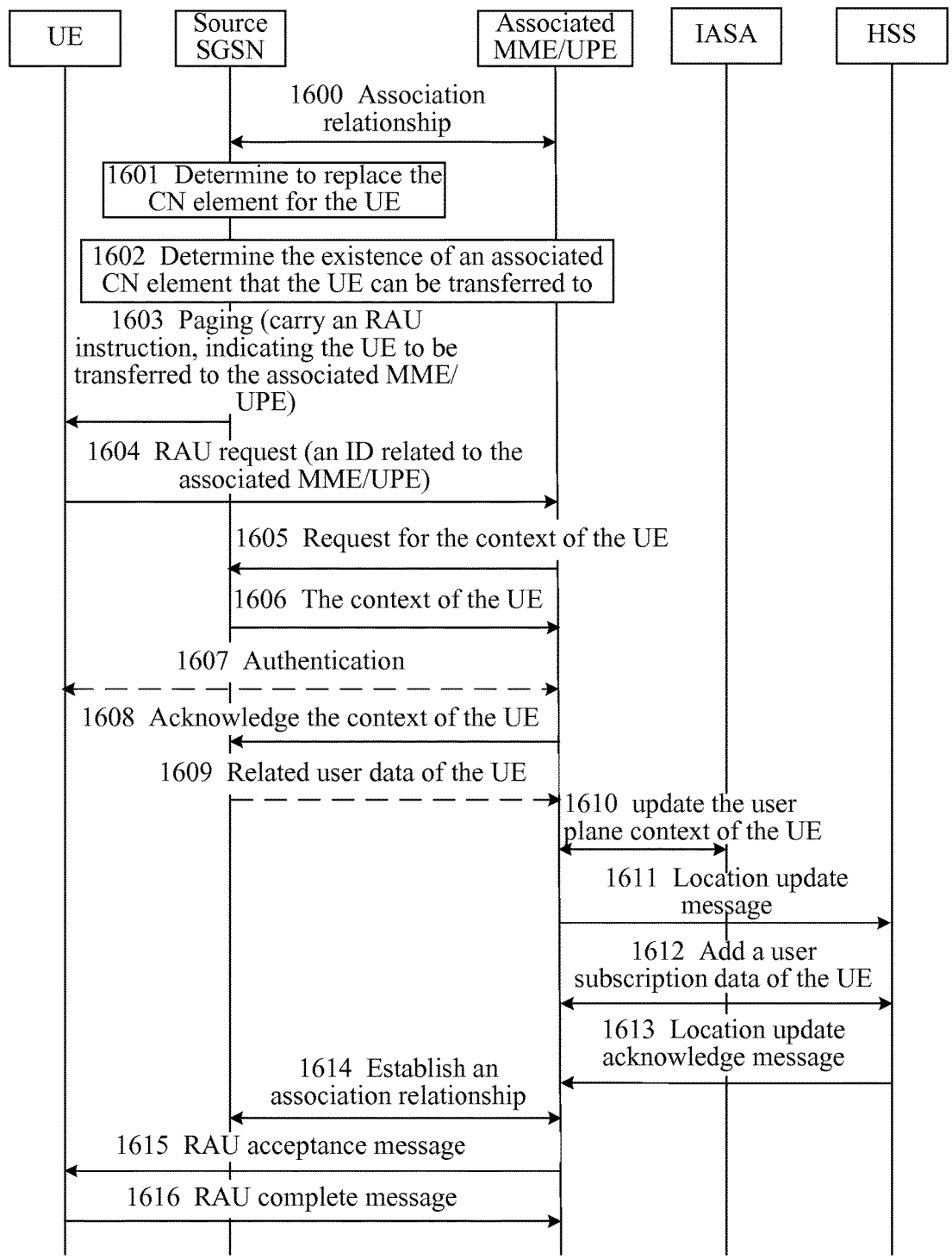
FIG. 16 is a flow chart of UE transferring between CN entities in a network where a UMTS network and an evolved network coexist triggered by the network side based on the RAU technique according to a first embodiment of the disclosure.

FIG. 16 is a flow chart of UE transferring between CN entities in a network where a UMTS network and an evolved network coexist triggered by the network side based on the RAU technique according to a first embodiment of the disclosure. In the network where the UMTS network and the evolved network coexist, if the UE residing in the UMTS network is attached to the two networks at the same time, when a downstream service with a high QoS requirement is sent to the UE, the UMTS network unsatisfactory while the evolved network can meet the QoS requirement of the service and is capable of receiving the UE transferred thereto, the UE is thus transferred to an associated CN element, so that the UE resides in the evolved network and communicates via the evolved network. The method includes the following steps.

In Step 1600, the source SGSN element is associated with the target MME/UPE element.

In Step 1601, the source SGSN element determines to replace the CN element for the UE.

In Step 1602, as for a UE to be transferred, the source SGSN element determines that an associated CN element exists, and that the UE can be transferred to the associated CN element.

In Step 1603, the source SGSN sends a paging carrying an RAU instruction to the UE, indicating the UE to be transferred to an associated MME/UPE element.

In Step 1604, the UE sends an RAU request via the access network. The request carries an ID of the associated MME/UPE element or a T-TMSI allocated by the associated MME/UPE element to the UE. The access network determines the target MME/UPE element according to the information carried in the request, and forwards the RAU request to the target MME/UPE element.

In Step 1605, the target MME/UPE element requests the source SGSN element for a related context of the UE.

In Step 1606, the source SGSN element returns the related context of the UE to the target MME/UPE element.

In Step 1607, the target MME/UPE element authenticates the UE.

In Step 1608, the target MME/UPE element replies a context acknowledge message to the source SGSN element.

In Step 1609, the source SGSN element sends related user data of the UE to the target MME/UPE element. This step is optional.

In Step 1610, a default IP bearer between the target MME/UPE element and the IASA is updated, and the message adopted may be, but is not limited to, a PDP context update request/response.

In Step 1611, the target MME/UPE element sends a location update message to the HSS, and the message may be, but is not limited to, Update Location.

In Step 1612, the HSS adds UE subscription data into the target MME/UPE element.

In Step 1613, the HSS sends a location update acknowledge message to the target MME/UPE element, and the message may be, but is not limited to, Update Location Ack.

In Step 1614, an association relationship is built between the target MME/UPE element and the source SGSN element.

In Step 1615, the target MME/UPE element sends an RAU acceptance message to the UE, and if the TMSI/RA changes, this information is also carried in the acceptance message.

In Step 1616, the UE sends an RAU complete message to the target MME/UPE element.

Figure 17:
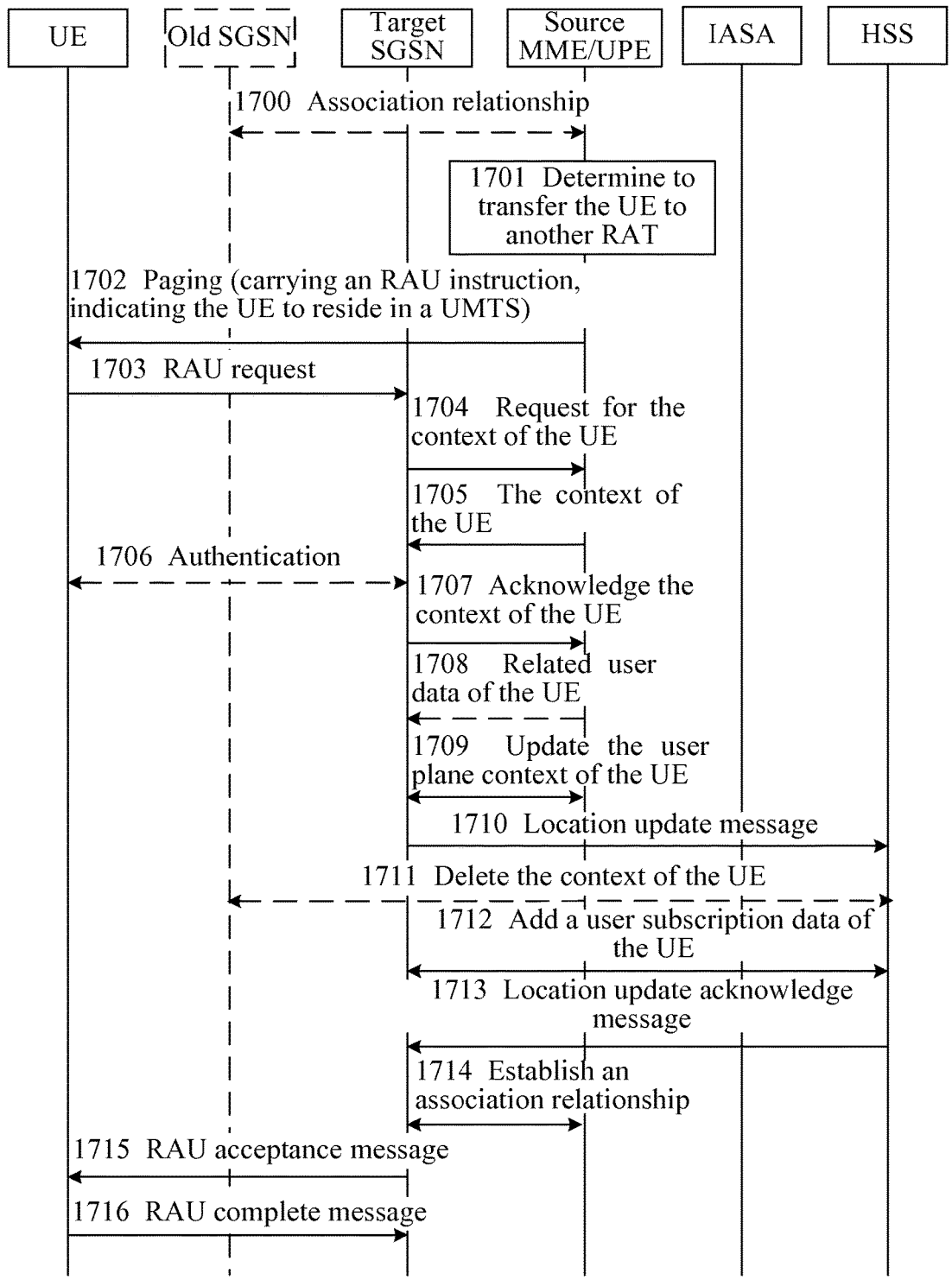
FIG. 17 is a flow chart of UE transferring between CN entities in a network where a UMTS network and an evolved network coexist triggered by the network side based on the RAU technique according to a second embodiment of the disclosure.

FIG. 17 is a flow chart of UE transferring between CN entities in a network where a UMTS network and an evolved network coexist triggered by the network side based on the RAU technique according to a second embodiment of the disclosure. In the network where the UMTS network and the evolved network coexist, if the UE is attached to and resides in the evolved network, when the MME/UPE pool area in the evolved network is overloaded, this embodiment is configured to transfer the UE to a UMTS network. The method includes the following steps.

In Step 1700, an old SGSN element associated with the source MME/UPE element might exist.

In Step 1701, the source MME/UPE element determines to transfer a UE to another RAT.

In Step 1702, the source MME/UPE element sends a paging carrying an RAU instruction to the UE, indicating the UE to be transferred to a UMTS network.

In Step 1703, the UE sends an RAU request via the UMTS access network. According to a set mechanism, the UMTS access network selects an SGSN element as a target SGSN element, and sends the RAU request to the selected target SGSN element.

In Step 1704, the target SGSN element requests the source MME/UPE element for a related context of the UE.

In Step 1705, the source MME/UPE element returns the related context of the UE to the target SGSN element.

In Step 1706, the target SGSN element authenticates the UE.

In Step 1707, the target SGSN element replies a context acknowledge message to the source MME/UPE element.

In Step 1708, the source MME/UPE element sends related user data of the UE to the target SGSN element. This step is optional.

In Step 1709, a default IP bearer between the target SGSN element and the MME/UPE is updated, and the message adopted may be, but not limited to, a PDP context update request/response.

In Step 1710, the target SGSN element sends a location update message to the HSS, and the message may be, but not limited to, Update Location.

In Step 1711, the HSS deletes the related context of the UE from the old SGSN element.

In Step 1712, the HSS adds UE subscription data into the target SGSN element.

In Step 1713, the HSS sends a location update acknowledge message to the target SGSN element, and the message may be, but not limited to, Update Location Ack.

In Step 1714, an association relationship is built between the target SGSN element and the source MME/UPE element.

In Step 1715, the target MME/UPE sends an RAU acceptance message to the UE, and if the TMSI/RA changes, this information is also carried in the acceptance message.

In Step 1716, the UE sends an RAU complete message to the target MME/UPE element.

In FIG. 17, if the old SGSN element exists, the target SGSN element may also trigger a process of obtaining the context of the UE from the old SGSN element, for example, implemented after Step 1705, which is not shown in the FIG. 17. The method of FIG. 17 assumes that the UPE element is located on a data path of the 2G/3G, i.e., user plane data is transmitted between the SGSN element, UPE element, and IASA element via the S3 interface in FIG. 3. Thus, the update of the UE context in Step 1709 is performed between the target SGSN element and the source MME/UPE element. If the user plane data is transmitted between the SGSN element and the IASA element via the S4 interface in FIG. 3, the update of the UE context in Step 1709 is performed between the target SGSN element and the IASA element.

Figure 18:
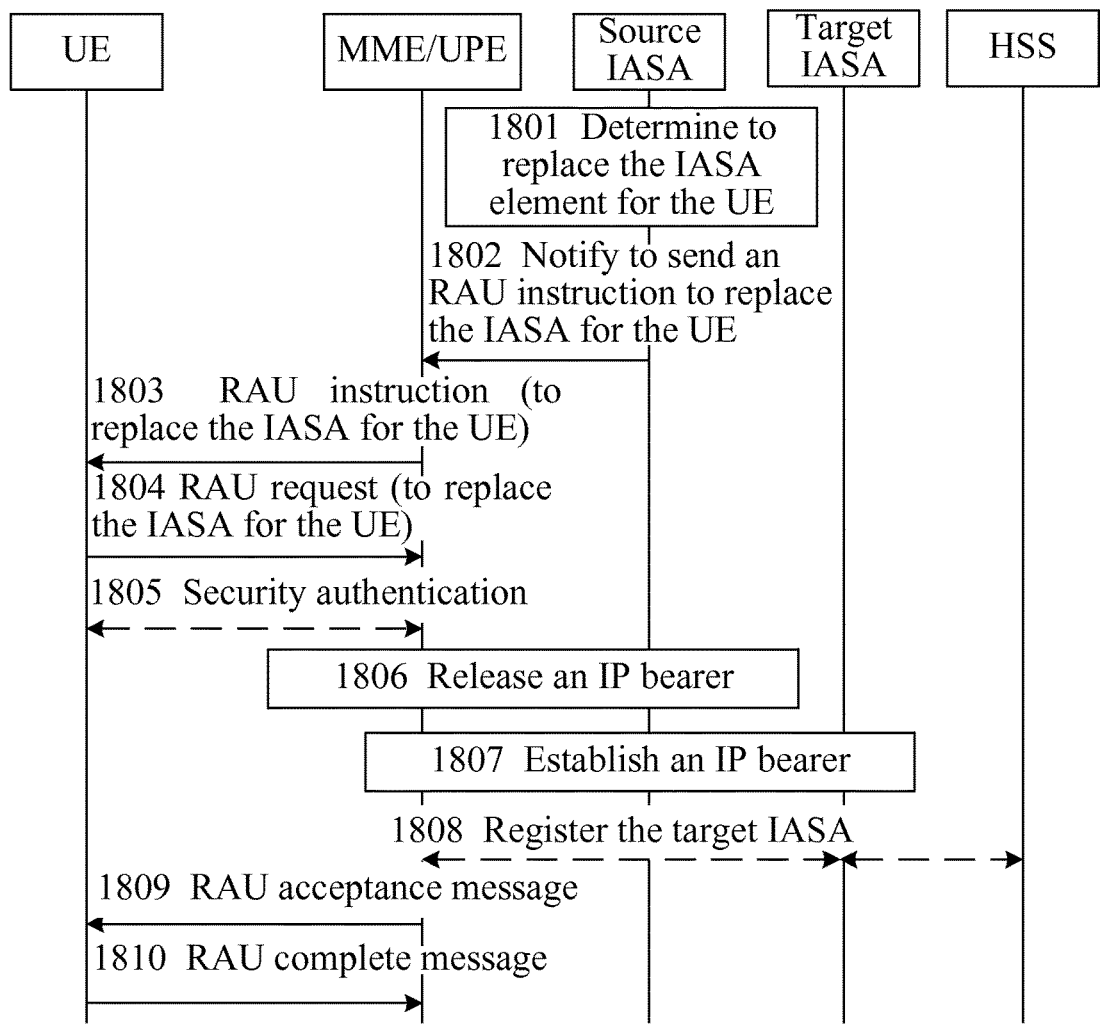
FIG. 18 is a flow chart of replacing an IASA element for a UE triggered by the network side based on the RAU technique according to an embodiment of the disclosure.

FIG. 18 is a flow chart of replacing the IASA element for the UE triggered by the network side based on the RAU technique according to an embodiment of the disclosure. Areas A and B both have different CNs. The UE subscribed in the area A moves to the area B after the area A initiates a communication process. During the movement, the change of the RA may cause the UE to initiate an RAU process, thus resulting in the migration of the MME/UPE element. It is specified in the protocol that the migration of the IASA element cannot be performed during the communication process, so after the UE subscribed in the area A during a session moves to the area B, though the current IASA element has already led to a route not being optimized of the UE, the UE cannot be transferred from the IASA of the area A to the IASA element of the area B, the IASA element may only be transferred till the end of the communication. The method includes the following steps.

In Step 1801, the source IASA element determines to replace the IASA element for a UE.

In Step 1802, the source IASA element notifies the MME/UPE element currently serving the UE to send an RAU instruction to the UE, so as to replace the IASA element for the UE.

In Step 1803, the MME/UPE element serving the UE sends an RAU instruction to the UE, indicating to replace the IASA element.

In Step 1804, the UE sends an RAU request to the MME/UPE element serving the UE via the access network, requesting to replace the IASA element.

In Step 1805, a security authentication is performed between the MME/UPE element serving the UE and the UE. This step is optional.

In Step 1806, the MME/UPE element serving the UE releases an IP bearer between itself and the source IASA element.

In Step 1807, the MME/UPE element serving the UE establishes an IP bearer to the target IASA element.

In Step 1808, the target IASA element is registered in the HSS for the UE. This step is optional.

In Step 1809, the MME/UPE element serving the UE sends an RAU acknowledgment to the UE.

In Step 1810, the UE sends an RAU complete message to the MME/UPE element serving the UE.

In FIG. 18, the source IASA element determines to replace the IASA element or the MME/UPE element determines to replace the IASA element for the UE, and the RAU is triggered to replace the IASA element. In Step 1806, the release of the IP bearer between the serving MME/UPE and the source IASA element may be performed before the RAU instruction, which is not safe. Once the UE receives no subsequent RAU instruction and does not initiate the RAU process, the UE may not have the IP bearer temporarily. In Step 1808, the registration of a new IASA element in the HSS is optional, and this step may be triggered by the MME/UPE element or by the target IASA element.

Seen from the UE transferring through the RAU technique, an embodiment of the disclosure provides a method of initiating an RAU process to transfer a UE by the network side in a mobile communication network. Six methods are also provided to prevent the access network from re-selecting the source CN element as the required CN element for the UE, thus effectively solving the problem of user transferring in the mobile communication system. As the UE transferring through the RAU technique does not need to reconstruct the context, the UE service may not be interrupted.

In the second mode, the UE is transferred through an attach technique.

This mode may be widely applied to various networks, instead of being limited to the evolved network. That is, the mode is also applicable to the UMTS network, the network where a UMTS network and an evolved network coexist, and even the post-evolved network as well as coexistence network in other forms.

The CN entities for transferring a UE mentioned in this mode may be SGSN entities, MME/UPE entities, or CN entities in the aforementioned networks. For example, the CN entities may be OMC entities, GGSN entities, IASA entities, and even CN entities in the post-evolved network.

Figure 19:
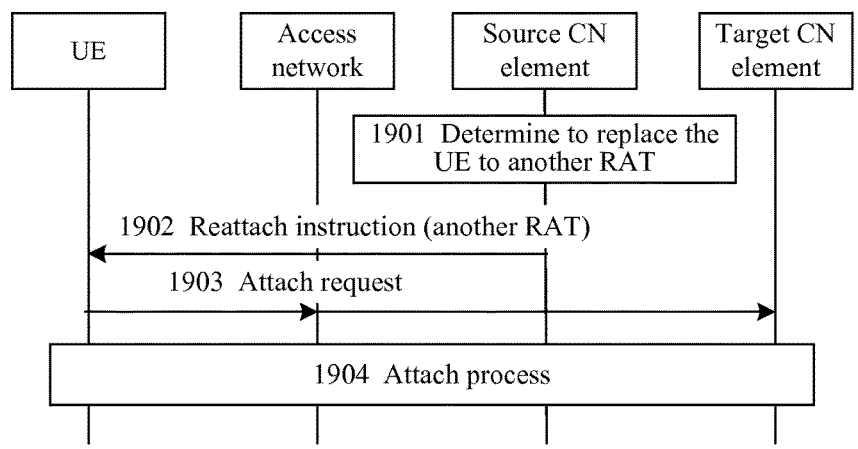
FIG. 19 is a flow chart of a first method for transferring a UE triggered by the network side based on an attach technique according to an embodiment of the disclosure.

FIG. 19 is a flow chart of a first method for transferring a UE triggered by the network side based on the attach technique according to an embodiment of the disclosure. The method includes the following steps.

In Step 1901, the source CN element determines to replace an RAT for a UE it serves due to factors such as overload, service requirements, or the reception of an O&M request.

In Step 1902, the source CN element sends a reattach request to the UE, indicating the UE to be transferred to another RAT.

The RAT information carried in the transfer instruction may be information for preventing the access of the UE to the original RAT, or one or more RATs selected by the source CN element for the UE. In the latter case, the candidate RATs are arranged in priority order and sent to the UE in the form of an RAT list, so that the UE selects the RAT accordingly.

In Step 1903, the UE selects an RAT according to the RAT information carried in the received reattach request, and sends an attach request in the RAT. According to a set mechanism, for example, load sharing, the access network selects a target CN element for the UE and sends the attach request to the target CN element.

In Step 1904, an attach process is implemented between the UE and the network.

When the UE is transferred to another RAT, the access network equipment needs to be switched. For example, when the UE is transferred from the UMTS network to the evolved network, the access network equipment changes from the RAN of the original 2G/3G network into the eRAN of the evolved network, and both the RAN and eRAN are represented by the access network in FIG. 19.

The method of FIG. 19 is applicable to the circumstance of transferring the RAT for the UE. For example, the first, due to the overload of one CN element in the network where the UMTS network and the evolved network coexist, the UE has to be transferred to another CN element with a lighter load. The second, the RAT is transferred for the UE on receiving an O&M request. The third, due to service requirements, for example, when downstream data with high QoS is sent to the UE attached to the SGSN, the UMTS network currently serving the UE is unsatisfactory while the evolved network meets the requirement, so that the UE has to be transferred to the evolved network.

Figure 20:
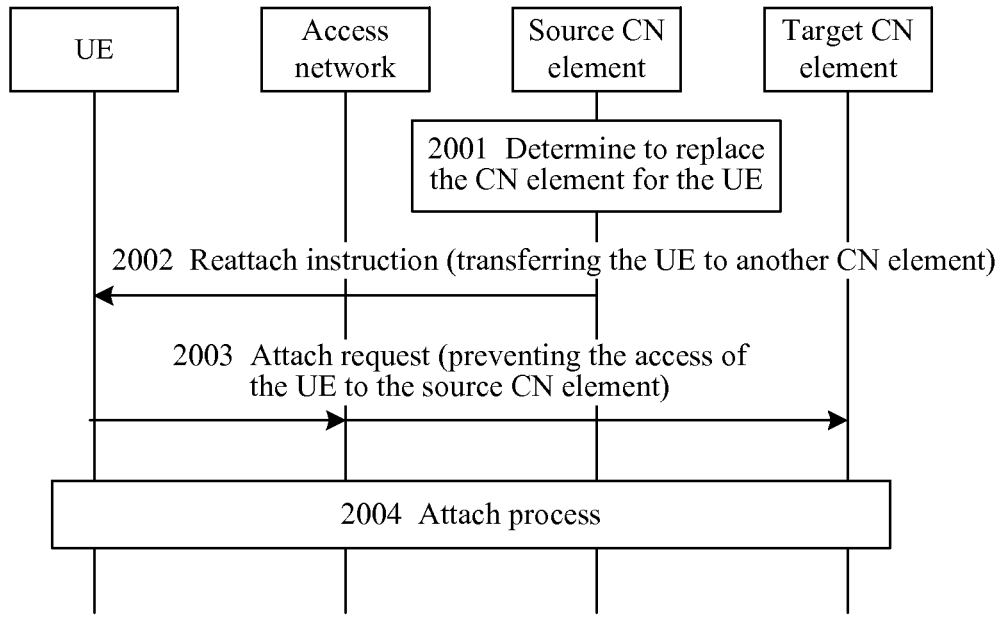
FIG. 20 is a flow chart of a second method for transferring a UE triggered by the network side based on the attach technique according to an embodiment of the disclosure.

FIG. 20 is a flow chart of a second method for transferring a UE triggered by the network side based on the attach technique according to an embodiment of the disclosure. The method includes the following steps.

In Step 2001, the source CN element determines to transfer the CN element for a UE it serves.

In Step 2002, the source CN element sends a reattach request to the UE, indicating the UE to be transferred to another CN element.

In Step 2003, on receiving the reattach request, the UE sends an attach request carrying information for preventing the access of the UE to the source CN element. According to the restriction information carried by the received attach request, the access network adopts a set mechanism, for example, load sharing, to select the target CN element for the UE, and forwards the attach request to the target CN element.

In Step 2004, an attach process is implemented between the UE and the network.

The method of FIG. 20 is generally adopted and widely applied to various circumstances, for example, in the case of an overload of the CN element that serves the UE, an O&M request, or routes not being optimized. In the method, the source CN element and the target CN element can belong to the same network or to different networks.

Figure 21:
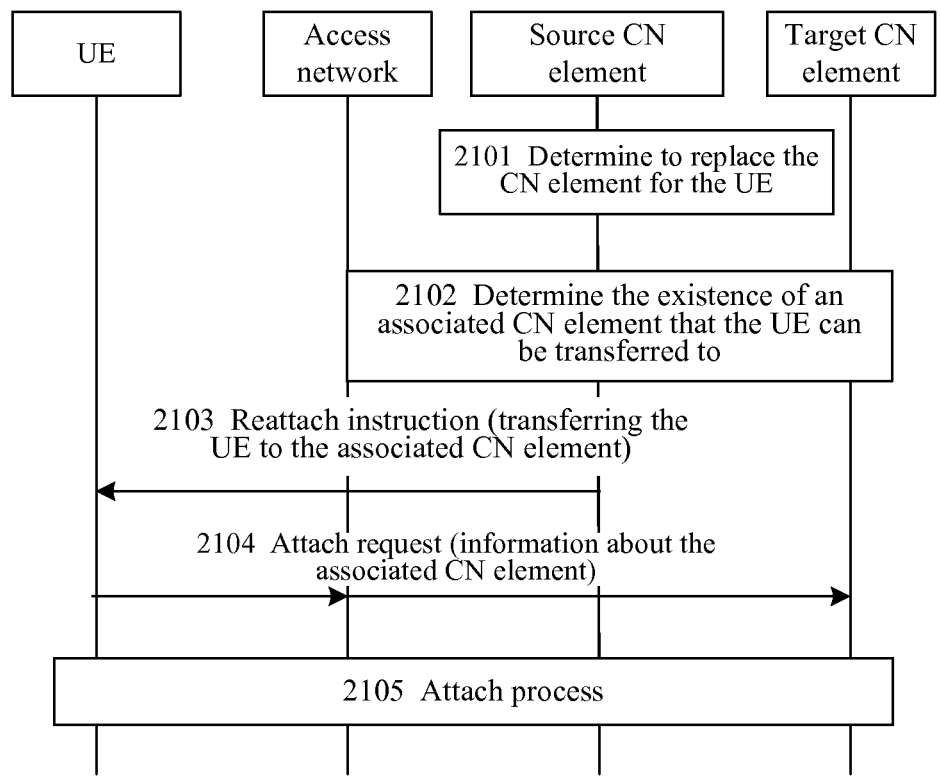
FIG. 21 is a flow chart of a third method for transferring a UE triggered by the network side based on the attach technique according to an embodiment of the disclosure.

FIG. 21 is a flow chart of a third method for transferring a UE triggered by the network side based on the attach technique according to an embodiment of the disclosure. The method includes the following steps.

In Step 2101, the source CN element determines to transfer the CN element for the UE.

In Step 2102, as for the UE to be transferred, the source CN element determines it has an associated CN element and the UE can be transferred to the associated CN element.

In Step 2103, the source CN element sends a reattach request to the UE, indicating the UE to be transferred to the associated CN element.

In Step 2104, the UE sends an attach request carrying an ID related to the associated CN element. According to the ID related to the associated CN element carried by the request, the access network sends the attach request to the associated CN element. The ID related to the associated CN element may be any identity capable of uniquely determining the associated CN element, for example, the identity of the associated CN element or the TMSI allocated by the associated CN element to the UE.

In Step 2105, an attach process is implemented between the UE and the network.

The method of FIG. 21 is applicable to the circumstance that the UE is simultaneously attached to two CN entities associated with each other, and selects a network to reside in. For example, the first, due to the overload of one CN element, the UE has to be transferred to the other CN element. The second, due to service requirements, when downstream data with high QoS is sent to the UE residing in the SGSN, the UMTS network is unsatisfactory while the evolved network meets the requirement, so that the UE needs to be transferred to the MME/UPE of the associated evolved network.

Figure 22:
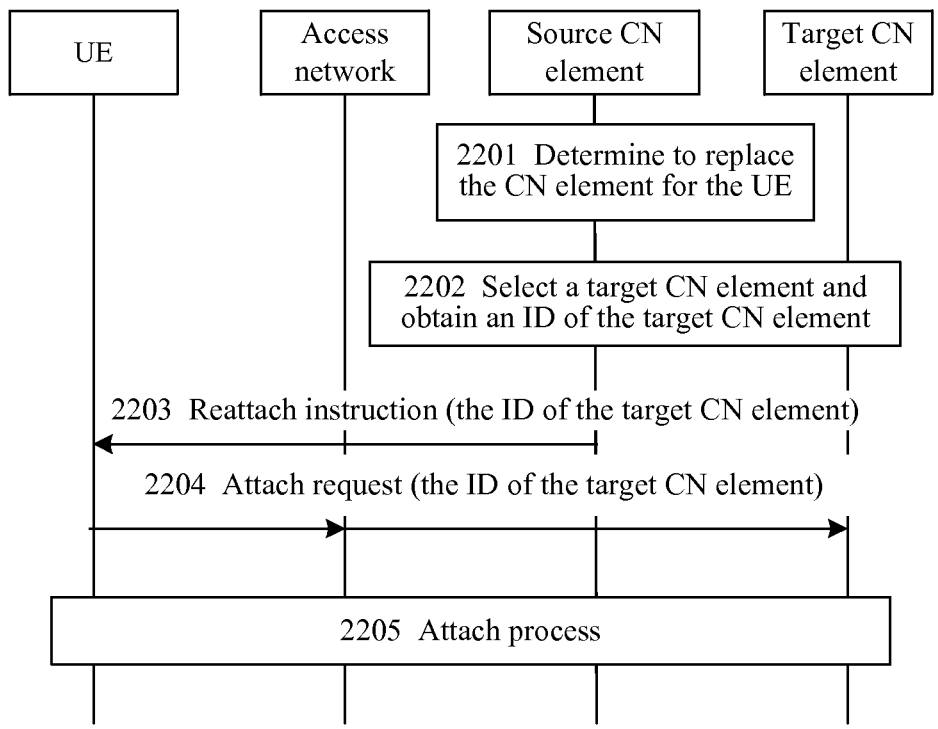
FIG. 22 is a flow chart of a fourth method for transferring a UE triggered by the network side based on the attach technique according to an embodiment of the disclosure.

FIG. 22 is a flow chart of a fourth method for transferring a UE triggered by the network side based on the attach technique according to an embodiment of the disclosure. The method includes the following steps.

In Step 2201, the source CN element determines to transfer the CN element for a UE.

In Step 2202, according to a set mechanism, for example, load sharing, the source CN element selects a target CN element with a lighter load from CN entities that share the same interface with the source CN element, and obtains an ID related to the target CN element.

The ID related to the target CN element may be any identity capable of uniquely determining the element, for example, the identity of the target CN element, the NRI of the target CN element, or the TMSI allocated by the target CN element to the UE. The TMSI is allocated by the CN to the UE. For example, the TMSI is U-TMSI in the UMTI network and S-TMSI in the evolved network.

In Step 2203, the source CN element sends a reattach request carrying the ID related to the target CN element to the UE.

In Step 2204, on receiving the reattach request, the UE sends an attach request carrying the ID related to the target CN element. The access network receives and forwards the attach request to the target CN element according to the ID related to the target CN element carried in the request.

In Step 2205, an attach process is implemented between the UE and the network.

The method of FIG. 22 is applicable to a circumstance that the source CN element obtains a target CN element for the UE according to a set mechanism. For example, when the source CN element is overloaded, another CN element is selected for the UE within the same pool area. When the route is not optimized, another CN element with a more preferred route is selected for the UE. In case of an O&M operation, for example, an OMC determines that part of the UEs on the SGSN element have to be transferred to the MME/UPE element, so that the OMC interacts with the MME/UPE element to obtain a related ID, then issues an O&M command to the SGSN element for transferring some UEs, and notifies the SGSN element of an ID related to the target MME/UPE element, and the SGSN element on receiving the command sends a reattach request to the UE. Or due to service requirements, for example, when downstream data with high QoS is sent to the UE residing in the SGSN element, the UMTS network is unsatisfactory while the SGSN element may obtain an MME/UPE element capable of receiving the UE transferred from the evolved network sharing the same interface with the element, and the MME/UPE element meets the QoS requirement, the method may be adopted to transfer the UE to the MME/UPE.

In the method of FIG. 22, the target CN element may be an associated CN element related to the source CN element of the UE, which is a special case of FIG. 21. In the method, the source CN element and the target CN element belong to the same network or to different networks.

Figure 23:
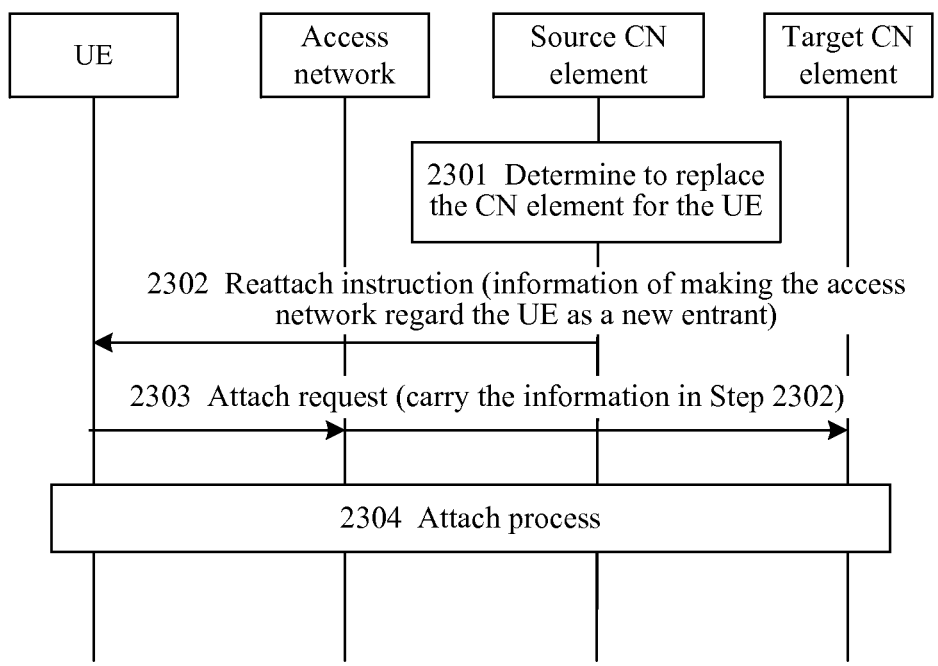
FIG. 23 is a flow chart of a fifth method for transferring a UE triggered by the network side based on the attach technique according to an embodiment of the disclosure.

FIG. 23 is a flow chart of a fifth method for transferring a UE triggered by the network side based on the attach technique according to an embodiment of the disclosure. The method includes the following steps.

In Step 2301, the source CN element determines to transfer the CN element for a UE.

In Step 2302, the source CN element sends a reattach request to the UE, indicating the UE to adopt an ID that makes the access network regard the UE as a new entrant to send an attach request.

When the indicated UE accesses again, the ID that makes the access network regard the UE as an entrant UE has various types, for example, a TMSI set as Null, a TMSI with an NRI field set as Null, or IDs of CN entities other than those currently within the area of the UE. Being the latter two, the ID has to be generated at the source CN element. Being the TMSI set as Null, the ID is generated merely by the source CN element sending a related instruction to the UE.

In Step 2303, the UE sends an attach request carrying the ID indicated in Step 2302. The access network receives the request, and determines the UE as an entrant UE according to the ID carried in the request. Therefore, the access network adopts a set mechanism, for example, load sharing, to select the target CN element, and sends the RAU request to the target CN element.

In Step 2304, an attach process is implemented between the UE and the network.

In Step 2303 of FIG. 23, the ID indicated in Step 2302 serves as an IE in an RRC field of the attach request, but the related ID does not need to serve as an IE in an NAS field of the attach request.

The method of FIG. 23 is applicable to a circumstance that the source CN element is overloaded and the UE has to be transferred to a CN element with a lighter load. In the method, the source CN element and the target CN element belong to the same network or to different networks.

Figure 24:
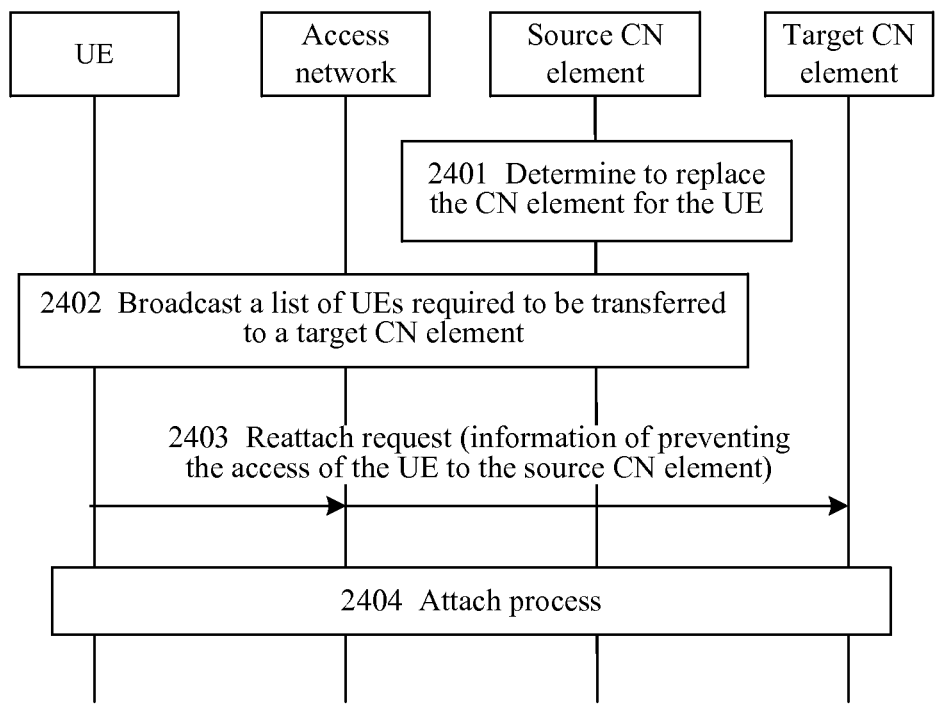
FIG. 24 is a flow chart of a sixth method for transferring a UE triggered by the network side based on the attach technique according to an embodiment of the disclosure.

FIG. 24 is a flow chart of a sixth method for transferring a UE triggered by the network side based on the attach technique according to an embodiment of the disclosure. The method includes the following steps.

In Step 2401, the source CN element determines to transfer the CN element for a UE.

In Step 2402, the source CN element broadcasts a list of UEs required to be reattached to other CNs, and meanwhile broadcasts information that prevents the access of the UEs to the source CN element.

In Step 2403, the UE monitors a broadcast message and determines whether the UE itself is arranged in the broadcast list. If the UE itself is arranged in the broadcast list, the UE sends an attach request carrying the information that prevents its access to the source CN element. According to the information carried in the received request, the access network adopts a set mechanism, for example, load sharing, to select the target CN element for the UE, and sends the attach request to the target CN element.

In Step 2404, an attach process is implemented between the UE and the network.

The method of FIG. 24 is applicable to circumstances that the source CN element is overloaded, in case of an O&M operation, and the CN element is to be shut down for maintenance or upgrade. In the method, the source CN element and the target CN element can belong to the same network or to different networks.

Two embodiments are given below to further illustrate certain aspects of the disclosure.

Figure 25:
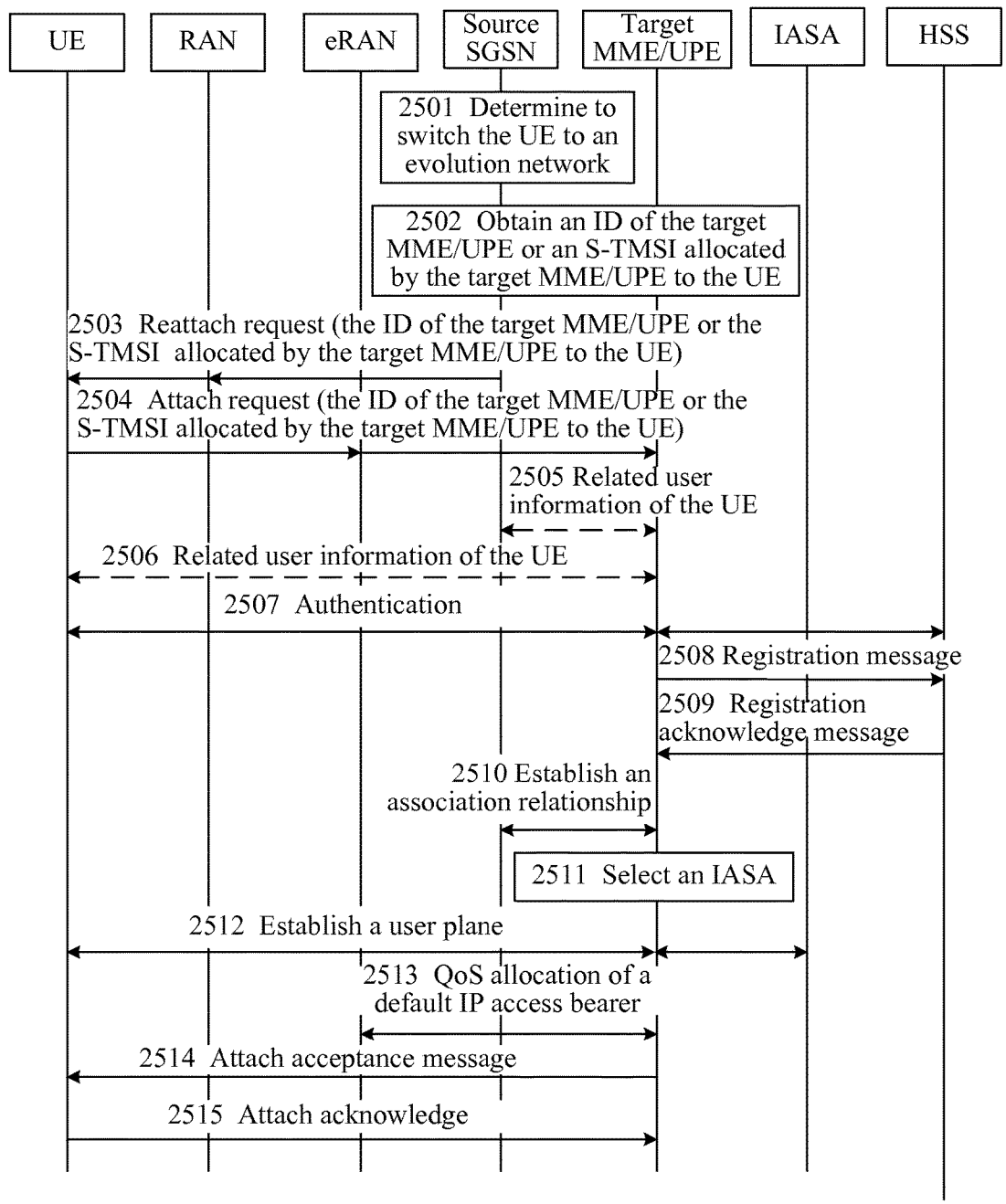
FIG. 25 is a flow chart of UE transferring between CN entities in a network where a UMTS network and an evolved network coexist triggered by the network side based on the attach technique according to a first embodiment of the disclosure.

FIG. 25 is a flow chart of UE transferring between CN entities in a network where a UMTS network and an evolved network coexist triggered by the network side based on the attach technique according to a first embodiment of the disclosure. In the network where the UMTS network and the evolved network coexist, the UE is attached to an SGSN element. When a downstream service with a high QoS requirement is sent to the UE, and the UMTS network is unsatisfactory, the SGSN element selects an MME/UPE element that can meet the QoS requirement from the evolved network sharing the same interface. At this point, the UE has to be transferred to the evolved network. The method includes the following steps.

In Step 2501, the source SGSN element determines to reattach a UE to the evolved network, so as to meet the high QoS requirement.

In Step 2502, according to a set mechanism, for example, load sharing, the source SGSN element obtains an ID of the target MME/UPE element or an S-TMSI allocated by the target MME/UPE element to the UE.

In Step 2503, the source SGSN element sends a reattach request carrying the ID of the target MME/UPE element or the S-TMSI allocated by the target MME/UPE element to the UE, indicating UE to be reattached to the evolved network.

In Step 2504, the UE sends an attach request carrying the ID of the target MME/UPE element or the S-TMSI allocated by the target MME/UPE element to the UE via the access network. The access network determines the target MME/UPE element according to the information carried in the attach request, and forwards the attach request to the target MME/UPE element.

In Step 2505, if the attach message also includes the U-TMSI allocated by the source SGSN element to the UE, the target MME/UPE element requests the source SGSN element for a user information, for example, a permanent user ID. This step is optional.

In Step 2506, if the target MME/UPE element fails to obtain the user information from the source SGSN element, the target MME/UPE element requests the UE for related user information. This step is optional.

In Step 2507, the target MME/UPE element authenticates the user.

In Step 2508, the target MME/UPE element is registered in the HSS, indicating that the element is currently serving the UE.

In Step 2509, the HSS acknowledges the registration of the target MME/UPE element, user subscription data authorized to the default IP access bearer is sent at the same time, and strategy charging control information of the default IP access bearer is sent to the target MME/UPE element at the same time.

In Step 2510, an association relationship is built between the source SGSN element and the target MME/UPE element.

In Step 2511, the target MME/UPE element selects an IASA.

In Step 2512, the IASA configures an IP layer with the confirmed user IP address, so that a user plane is established, and a default strategy charging rule is adapted.

In Step 2513, the target MME/UPE element provides the eRAN with an allocation of QoS of the default IP access bearer, for example, an upper limit of the data transmission rate.

In Step 2514, the target MME/UPE accepts the network attachment of the UE, temporarily allocates an ID to the UE, and also sends the confirmed user IP address to the UE.

In Step 2515, the UE acknowledges the success of the network attachment.

In FIG. 25, Step 2510 may be moved afterward, for example, to be performed after the user plane is established. In some embodiments, there are other circumstances that the UE is required to be transferred from the UMTS network to the evolved network. For example, when the SGSN element is overloaded, the UE attached the SGSN element should be transferred to the MME/UPE element. The embodiment of FIG. 25 is also applicable.

Figure 26:
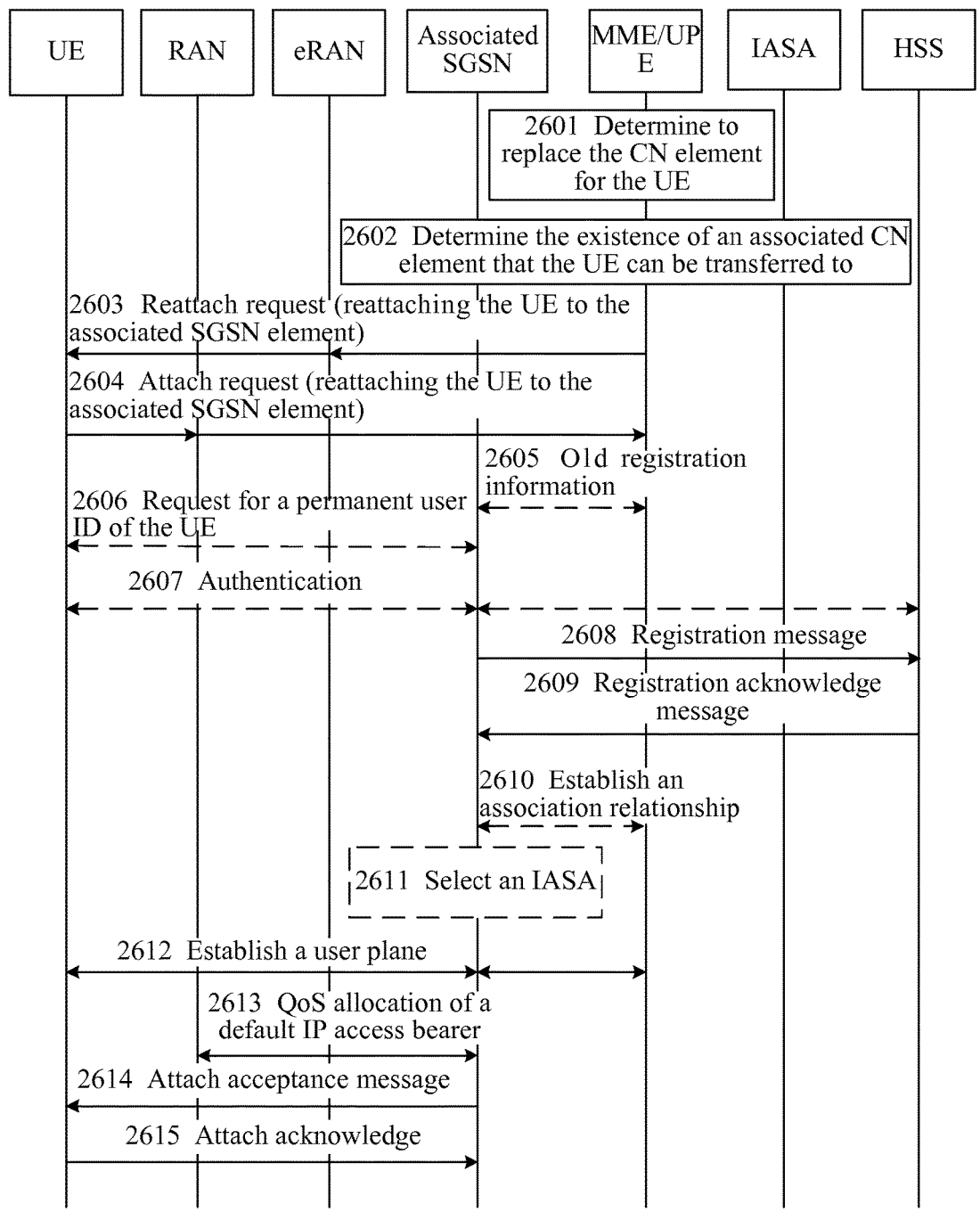
FIG. 26 is a flow chart of UE transferring between CN entities in a network where a UMTS network and an evolved network coexist triggered by the network side based on the attach technique according to a second embodiment of the disclosure.

FIG. 26 is a flow chart of UE transferring between CN entities in a network where a UMTS network and an evolved network coexist triggered by the network side based on the attach technique according to a second embodiment of the disclosure. In the network where the UMTS network and the evolved network coexist, if the UE residing in the MME/UPE element is attached to the UMTS and the evolved network at the same time, when the MME/UPE element is overloaded while the associated SGSN element bears a lighter load, part of the UEs on the MME/UPE element are required to be transferred to the associated SGSN element. The method includes the following steps.

In Step 2601, the MME/UPE element determines to replace the CN element for a UE.

In Step 2602, as for the UE to be transferred, the MME/UPE element determines that an associated SGSN element exists, and that the UE can be transferred to the associated SGSN element.

In Step 2603, the MME/UPE element sends a reattach request to the UE, indicating the UE to be reattached to the associated SGSN element.

In Step 2604, the UE sends the associated SGSN element an attach request carrying an ID related to the associated SGSN element via the access network. According to the ID related to the associated SGSN element, the access network transfers the UE to the associated SGSN element.

In Step 2605, if the attach message also includes the U-TMSI allocated by the source MME/UPE element to the UE, the associated SGSN element requests the source MME/UPE element for a user information, for example, a permanent user ID. This step is optional.

In Step 2606, if the associated SGSN element fails to obtain the user information from the source MME/UPE element, the associated SGSN element requests the UE for the permanent user ID. This step is optional.

In Step 2607, the associated SGSN authenticates the user. This step is optional.

In Step 2608, the associated SGSN element is registered in the HSS, indicating that the element is currently serving the UE.

In Step 2609, the HSS acknowledges the registration of the associated SGSN element, user subscription data authorized to the default IP access bearer is sent at the same time, and strategy charging control information of the default IP access bearer is sent to the associated SGSN element at the same time.

In Step 2610, an association relationship is rebuilt between the associated SGSN element and the source MME/UPE element. This step is optional.

In Step 2611, the associated SGSN element selects an IASA. This step is optional.

In Step 2612, the IASA element configures an IP layer with the confirmed user IP address, so that a user plane is established, and a default strategy charging rule is applied.

In Step 2613, the associated SGSN element provides the eRAN with an allocation of QoS of the default IP access bearer, for example, an upper limit of the data transmission rate.

In Step 2614, the associated SGSN element accepts the network attachment of the UE, temporarily allocates a temporary ID to the UE, and also sends the confirmed user IP address to the UE.

In Step 2615, the UE acknowledges the success of the network attachment.

In Step 2612 of FIG. 26, a user plane is established from the associated SGSN element to the source MME/UPE element. That is, the UPE is assumed to be located on a data path of the 2G/3G network, and user plane data is transmitted between the SGSN element, UPE element, and IASA element via the S3 interface in FIG. 3. If the user plane data is transmitted between the SGSN element and the IASA element via the S4 interface in FIG. 3, the user plane is established between the SGSN element and the IASA element in Step 2612.

As can be seen from the UE transferring through the attach technique, an embodiment of the disclosure provides a method for initiating an attach process to transfer a UE by the network side in a mobile communication network. Six methods are also provided to prevent the access network from re-selecting the source CN element as the required CN element for the UE, thus effectively solving the problem of user transferring in the mobile communication system.

In an embodiment of the disclosure, a method for transferring a UE through a UE detach and reattach process initiated by the network side in a mobile communication network is provided.

Compared with the above two modes provided in the embodiment of the disclosure, the initiation of the UE detach and reattach process by the network side to transfer the UE has certain limitations, and is mainly applicable to UE transferring between RATs related to the UMTS network. As the UMTS network specifies the process of detaching and reattaching the UE, the method can be adapted to make the UE better compatible in the UMTS network, and thus the UE capable of accessing the UMTS network does not need any change.

Figure 27:
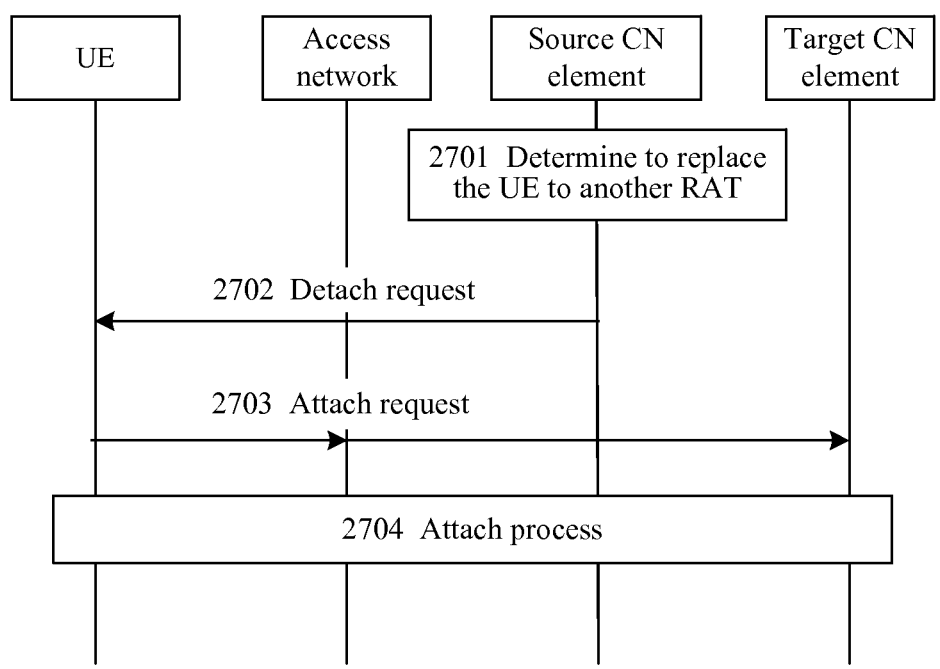
FIG. 27 is a flow chart of a method for transferring a UE through a detach and reattach process according to an embodiment of the disclosure.
Figure 28:
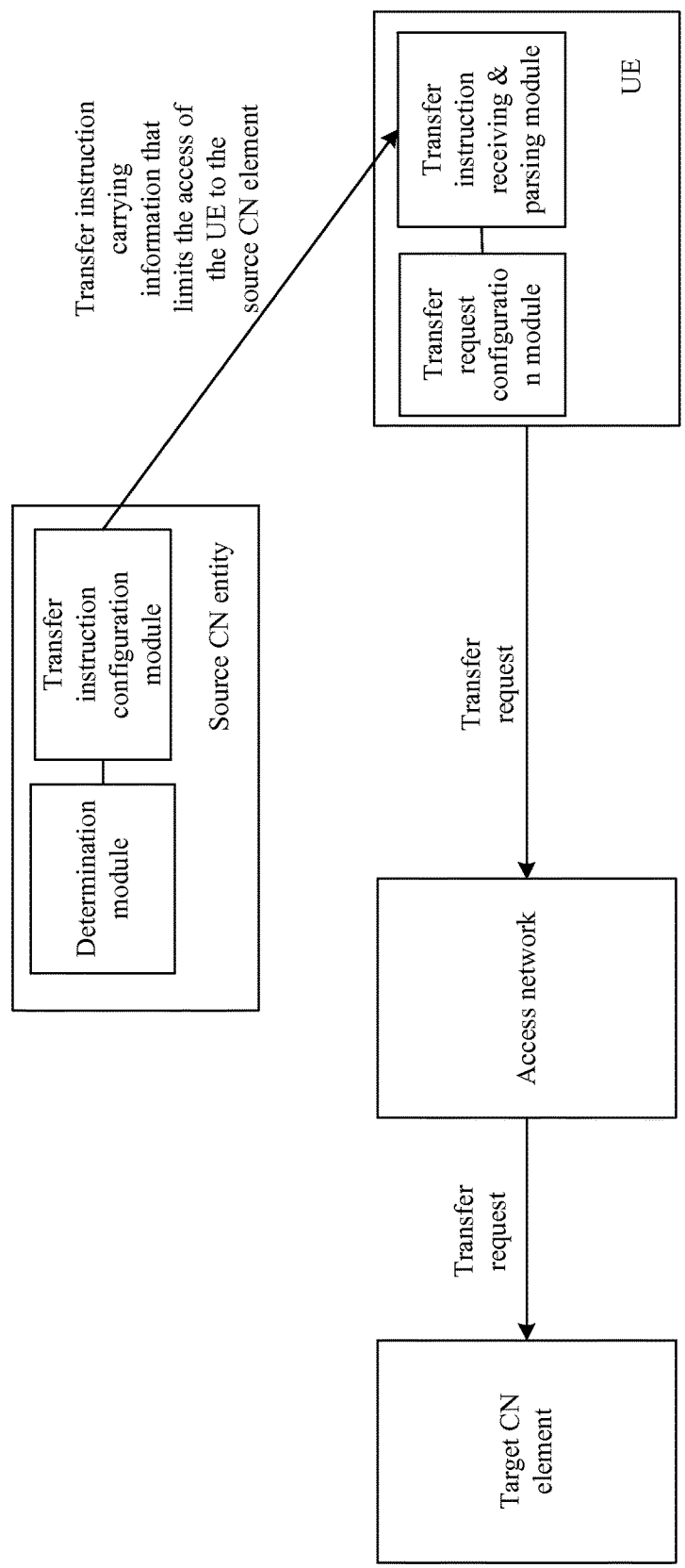
FIG. 28 is a schematic view of a system for transferring a UE in a mobile communication system according to an embodiment of the disclosure.

FIG. 27 is a flow chart of the method for transferring a UE through a detach and reattach process according to an embodiment of the disclosure. The method includes the following steps.

In Step 2701, the source CN element determines to replace an RAT for a UE.

In Step 2702, the source CN element sends a detach request to the UE, indicating the UE to subsequently send a request for being attached to another CN element.

In Step 2703, the UE sends an attach request, and the access network selects a target CN element for the UE according to a set mechanism, for example, load sharing.

In Step 2704, an attach process is implemented between the UE and the network.

The method for transferring a user equipment between CN entities according to an embodiment of the disclosure is not only applicable to a user equipment transferring process initiated by entities such as a serving GPRS support node (SGSN), MME and UPE, but also applicable to all user equipment transferring processes initiated by a CN element in the above networks. For example, the method is also applicable to the process of transferring a user equipment to another CN element initiated by a CN element in an operation and maintenance centre (OMC), gateway GPRS support node (GGSN), IASA or even post-SAE network. The method provided according to the embodiments of the disclosure is initiated by the network side, and a more preferred serving CN element is selected for the user according to a certain mechanism, thus providing a better service for the user of the UE.

In FIG. 27, in order to reattach the UE to another RAT, a particular ID is carried in the detach request, the UE sends an attach request carrying the particular ID, and the access network determines whether to assign an RAT or not according to the particular ID. If the access network determines to assign an RAT or not according to the particular ID, a normal attach process is performed; otherwise, the access is rejected and the UE initiates a new attach process. For example, the particular ID may be an NRI field in the TMSI, and the length of the NRI field is 10 byte. If the NRI is equal to a binary number 1111111111, it indicates that the UE will access an evolved network, and if the NRI is equal to a binary number 1111111110, it indicates that the UE will access a UMTS network. The access network determines whether to assign an RAT or not according to the NRI field in the TMSI, and performs corresponding operations.

The method of FIG. 27 is applicable to the circumstances of replacing the RAT for the UE. For example, due to the overload of one CN element in the network where the UMTS network and the evolved network both coexist, the UE has to be transferred to another CN element with a lighter load. The RAT is replaced for the UE on receiving an O&M request. Due to service requirements, for example, when downstream data with high QoS is sent to the UE attached to the SGSN, the UMTS network currently serving the UE is unsatisfactory while the evolved network meets the requirement, so that the UE has to be transferred to the evolved network.

In the embodiments of the disclosure, the evolved network may be an SAE.

In an embodiment of the disclosure, a system for transferring a UE in a mobile communication system is also provided. The system includes a UE, a source CN element, a target CN element and an access network. The source CN element sends a transfer instruction carrying UE transfer restriction information to the UE after determining the UE that the source CN element is serving to be transferred. The UE receives the transfer instruction carrying the UE transfer restriction information from the source CN element, and sends a transfer request according to the restriction information. The access network obtains the transfer request sent by the UE, selects a target CN element that is different from the source CN element according to the received request, and forwards the transfer request sent by the UE to the target CN element. The target CN element receives the transfer request forwarded by the access network and transfers the UE to the target element.

In the embodiments of the disclosure, the source CN element further includes a determination module and a transfer instruction constructing module connected to the determination module. The determination module is configured to determine to transfer the UE that the source CN element serves and send a transfer signaling to the transfer instruction constructing module. The transfer instruction constructing module is configured to construct a transfer instruction carrying the restriction information to be sent to the UE after receiving the transfer signaling.

In the embodiments of the disclosure, the UE further includes a transfer instruction receiving and parsing module and a transfer request construction module. The transfer instruction receiving and parsing module is configured to receive and parse the transfer instruction carrying the restriction information from the source CN element, and send the restriction information to the transfer request construction module. The transfer request construction module is configured to construct and send a transfer request according to the received restriction information.

In practice, the functions of the source CN element and the target CN element may be integrated in one CN element, so as to serve as the source CN element or the target CN element for different UEs in various applications.

Figure 29:
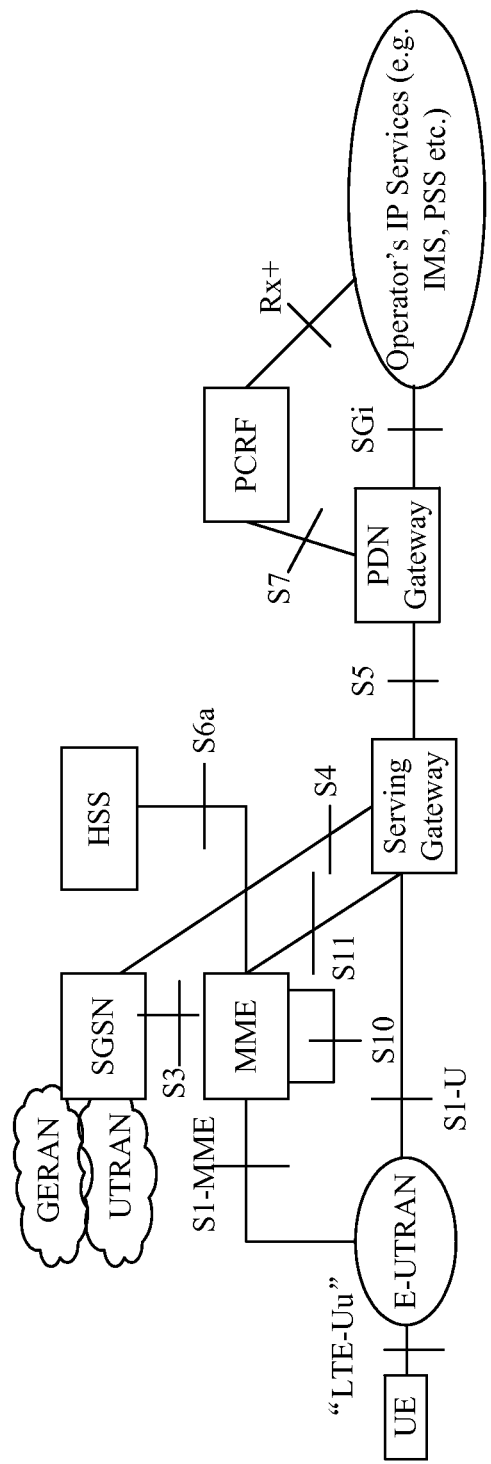
FIG. 29 is a schematic view of a conventional network architecture of separated control plane and user plane.

It should be noted that, the above provided solutions are not only applicable to architectures of integrated control plane and user plane, but are also applicable to architectures of separated control plane and user plane. FIG. 29 is a schematic view of a network architecture of separated control plane and user plane in TS23.401. The S-GW serves as a UPE and 3GPP anchor in TS23.882, and the PDN GW serves as an SAE anchor.

In the architecture of separated control plane and user plane, the user also needs to be transferred, for example, when the MME or GW is overloaded, the route is not optimized, or an O&M request is received. The user transferring in the architecture of separated control plane and user plane may have the following circumstances: (1) the MME changes while the GW stays the same; (2) the GW changes while the MME stays the same; and (3) the MME and the GW change at the same time.

As for the circumstance in (3) that the MME and the GW change at the same time, the solution provided in the above embodiment of the disclosure may be adopted for user transferring, and the details will not be described herein again. The circumstances in (1) and (2) will be illustrated in detail below.

In circumstance (1), the MME changes while the GW stays the same.

This circumstance occurs when the MME is overloaded or an O&M request is received for only replacing the MME. Here, the information telling the UE only to replace the MME but not replace the GW may be selectively carried in the transfer instruction sent to the UE. Further, the target MME obtains a user plane information by requesting the source MME for a user context, so that the original bearer does not need to be released, thus avoiding reconstructing the user context and maintaining the service continuity.

In the circumstance that the MME changes while the GW stays the same, a TAU or reattach mode can be adopted for MME user transferring. These two modes will be illustrated in detail below.

Figure 30:
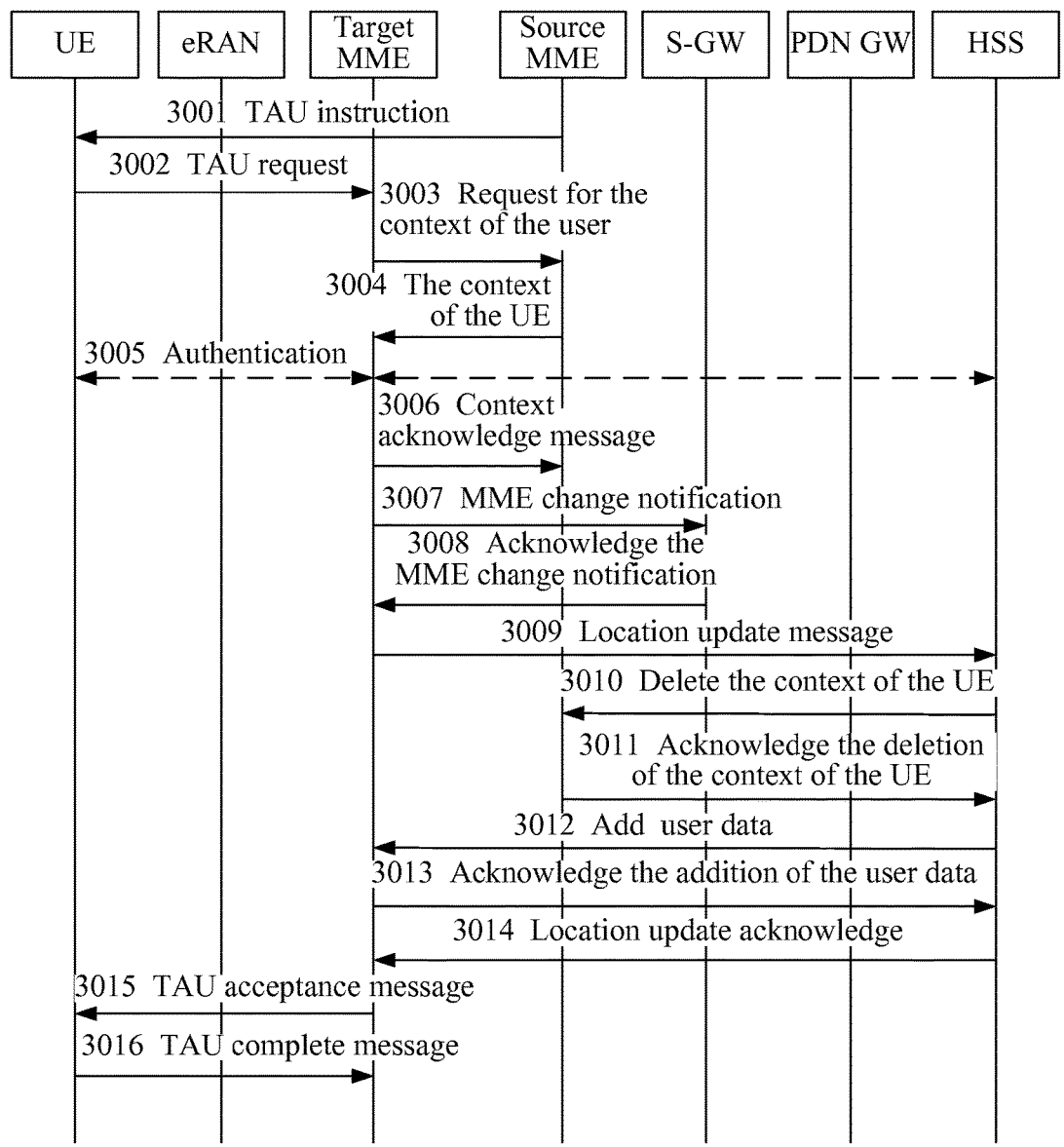
FIG. 30 is a flow chart of a method for performing MME user transferring through a tracking area update (TAU) technique in the network architecture of separated control plane and user plane according to an embodiment of the disclosure.

FIG. 30 is a flow chart of a method for performing MME user transferring through a TAU technique in a network architecture of separated control plane and user plane. The method includes the following steps.

In Step 3001, when the network side determines that the MME needs to be replaced while the GW stays the same, the source MME sends a TAU instruction to the UE, indicating the UE to re-initiate a TAU process. Here, the network side may carry the information indicating the UE to be transferred to another MME or carry an ID of the target MME in the TAU instruction to be sent to the UE, so as to inform the UE to replace the MME.

In Step 3002, the UE receives the TAU instruction from the source MME, and sends a TAU request to the target MME.

In Step 3003, the target MME requests the source MME for a user context.

In Step 3004, the source MME returns the user context to the target MME.

In Step 3005, the UE is authenticated.

In Step 3006, the target MME replies a context acknowledge message to the source MME.

In Step 3007, the target MME notifies the S-GW that the serving MME of the UE changes.

In Step 3008, the S-GW records the current serving MME of the UE, and returns an acknowledge message to the target MME.

Steps 3007 and 3008 may be performed after Step 3014, for notifying the S-GW that the serving MME of the UE changes. When downstream data is sent to the UE subsequently, the S-GW notifies a new serving MME to perform paging.

In Step 3009, the target MME sends a location update message to an HSS.

In Steps 3010 to 3011, the HSS deletes the related context of the user from the source MME.

In Steps 3012 to 3013, the HSS adds user subscription data into the target MME.

In Step 3014, the HSS sends a location update acknowledge message to the target MME.

In Step 3015, the target MME sends a TAU acceptance message to the UE, and if the SAE-TMSI (S-TMSI)/TA changes, this information is also carried in the acceptance message.

In Step 3016, the UE sends a TAU complete message to the target MME.

Figure 31:
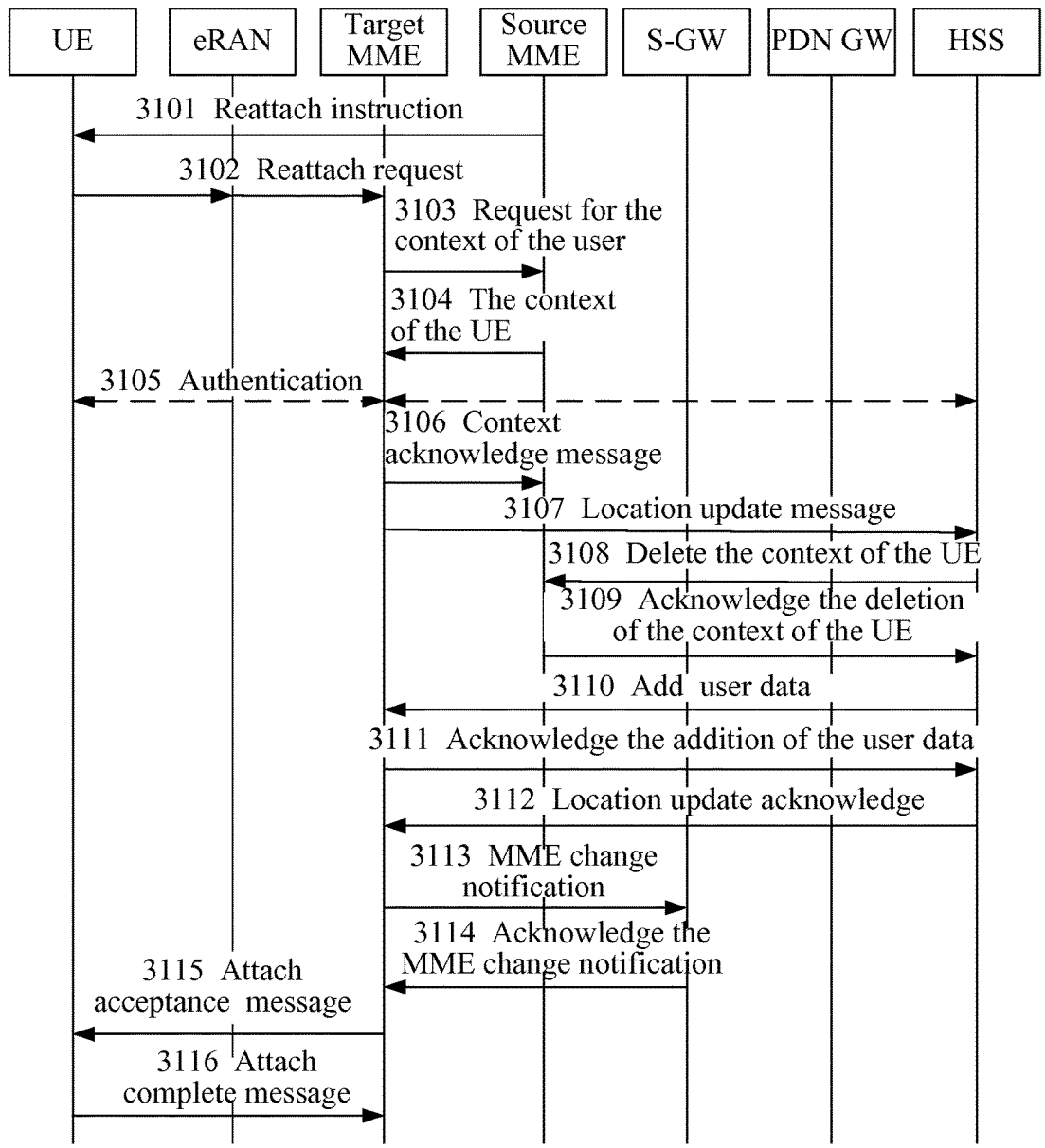
FIG. 31 is a flow chart of a method for performing MME user transferring through a reattach technique in the network architecture of separated control plane and user plane according to an embodiment of the disclosure.

FIG. 31 is a flow chart of a method for performing MME user transferring through a reattach technique in a network architecture of a control plane separated from a user plane. The method includes the following steps.

In Step 3101, when the network side determines that the MME needs to be replaced while the GW stays the same, the source MME sends a reattach instruction to the UE, indicating the UE to be reattached. Here, the network side may carry the information indicating the UE to be transferred to another MME or carry an ID of the target MME in the reattach instruction to be sent to the UE, so as to notify the UE to replace the MME.

In Step 3102, the UE sends a reattach request to the target MME, indicating the target MME to request the source MME for the context instead of reconstructing the context.

In Step 3103, the target MME requests the source MME for the user context.

In Step 3104, the source MME returns the user context to the target MME.

In Step 3105, the UE is authenticated.

In Step 3106, the target MME replies a context acknowledge message to the source MME.

In Step 3107, the target MME sends a location update message to the HSS.

In Steps 3108 to 3109, the HSS deletes the related context of the user from the source MME.

In Steps 3110 to 3111, the HSS adds user subscription data into the target MME.

In Step 3112, the HSS sends a location update acknowledge message to the target MME.

In Step 3113, the target MME notifies the S-GW that the serving MME of the UE changes.

In Step 3114, the S-GW records the current serving MME of the UE, and returns an acknowledge message to the target MME.

Steps 3113 and 3114 may be performed after Step 3106, for notifying the S-GW that the serving MME of the UE changes. When downstream data is sent to the UE subsequently, the S-GW notifies a new serving MME to perform paging.

In Step 3115, the target MME sends an attach acceptance message to the UE.

In Step 3116, the UE sends an attach complete message to the target MME.

Further, the MME user transferring may also be realized through a detach mode. The detailed process is as follows. The source MME sends a detach request to the UE, indicating the UE to initiate a reattach process so as to be reattached to another MME. Subsequently, the UE sends an attach request to the network side, and the access network selects a new MME for the UE according to a certain mechanism, for example, load sharing.

In circumstance (2), the GW changes while the MME stays the same.

This circumstance occurs when the GW is overloaded and an O&M request is received for only replacing the GW. Here, a target GW needs to allocate a bearer resource to the UE to be transferred, establish a bearer with the neighboring user plane element, and release the bearer resource allocated by a source GW to the UE.

The above circumstance can be further divided into two types, i.e., the UE is not notified of the GW replacement and the UE is notified of the GW replacement. These two modes will be illustrated in detail below.

Figure 32:
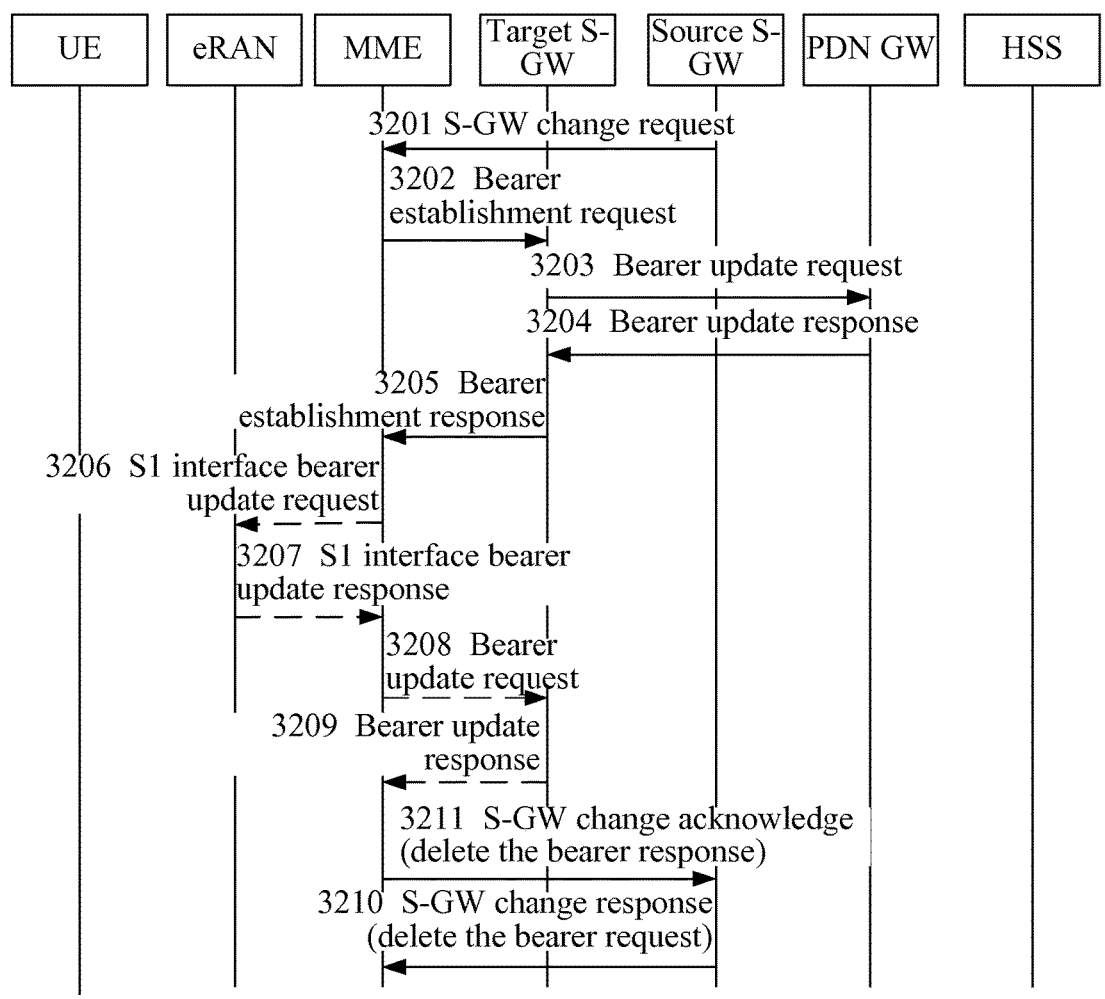
FIG. 32 is a flow chart of a transferring method when an serving gateway (S-GW) changes in the network architecture of separated control plane and user plane according to an embodiment of the disclosure.

When the IP address of the UE is unchanged, for example, the S-GW changes while the PDN GW stays the same, the mode of not notifying the UE about the GW replacement is adopted, and the MME only has to record the change of the GW. FIG. 32 is a flow chart of the transferring when the S-GW changes. The process includes the following steps.

In Step 3201, the source S-GW sends an S-GW change request to the MME.

In Step 3202, the MME sends a bearer establishment request to the target S-GW, requesting for establishing a bearer between the target S-GW and the PDN GW for the UE to be transferred.

A target S-GW address can be carried in the S-GW change request sent by the source S-GW to the MME in Step 3201, and the MME sends a bearer establishment request to the target S-GW according to the received target S-GW address. Or, the MME selects an S-GW which is not the source S-GW as a target S-GW according to a preset mechanism.

In Step 3203, the target S-GW allocates a downstream bearer resource to the UE to be transferred, for example, a user plane tunnel endpoint identifier (TEID), and sends a bearer update request carrying the downstream bearer resource information to the PDN GW.

In Step 3204, on receiving the bearer update request, the PDN GW performs the bearer update, records the downstream bearer resource information allocated by the target S-GW to the UE, and returns a bearer update response to the target S-GW.

Here, it is unnecessary for the PDN GW to re-allocate an upstream bearer resource to the UE. The source S-GW may send to the MME the upstream bearer resource information originally allocated by the PDN GW to the UE in Step 3201, and the MME forwards the upstream bearer resource information to the target S-GW in Step 3202. Or, in Step 3204, the PDN GW notifies the upstream bearer resource information to the target S-GW.

In Step 3205, the target S-GW returns to the MME a bearer establishment response carrying the upstream bearer resource information allocated by the target S-GW to the UE, and the MME parses and records the resource information.

In Step 3206, the MME sends to the eRAN an S1 interface bearer update request carrying the upstream bearer resource information allocated by the target S-GW to the UE.

In Step 3207, the eRAN records the received upstream bearer resource information, and returns an S1 interface bearer update response to the MME.

It should be noted that, when the eRAN is unchanged, it is unnecessary for the eRAN to re-allocate a downstream bearer resource to the UE. The source S-GW may send to the MME the downstream bearer resource information originally allocated by the eRAN to the UE in Step 3201, and the MME forwards the downstream bearer resource information to the target S-GW in Step 3202.

If the downstream bearer resource information allocated by the eRAN to the UE is not carried in Steps 3201 and 3202 or the eRAN changes, the eRAN has to send to the MME the downstream bearer resource information allocated to the UE in Step 3207, and then perform Step 3208.

In Step 3208, the MME sends a bearer update request to the target S-GW. If the downstream bearer resource information allocated by the eRAN to the UE is carried in Step 3207, the downstream bearer resource information is carried in the request message.

In Step 3209, the target S-GW records the received downstream bearer resource information, and returns a bearer update response to the MME.

In Step 3210, the MME sends an S-GW change response to the source S-GW.

In Step 3211, the source S-GW returns an S-GW change acknowledgment to the MME.

When to release the original bearer depends on actual requirements. For example, if the original bearer is released in Steps 3210 and 3211, the MME sends a bearer delete request to the source S-GW in Step 3210 so as to delete the user plane context stored in the source S-GW, and the source S-GW returns a bearer delete response to the MME in Step 3211.

Steps 3206 to 3209 are optional. If the UE is in an idle state, Steps 3206 to 3209 will not be performed, as the bearer of the S1 interface is released in this state. If the UE is in an active state, Steps 3206 to 3209 are performed to re-establish the bearer on the S1 interface.

It should be noted that, in the process of FIG. 32, a message is first sent to the MME, and the MME triggers the bearer establishment. However, in practice, it is unnecessary for the MME to trigger the bearer establishment. Instead, after the target S-GW is selected, the source S-GW notifies the PDN GW to replace the S-GW by the target S-GW, and the PDN GW triggers a downward bearer establishment.

As for the circumstance that the UE needs to be notified of the change of the GW, one possible reason is that the PDN GW changes. As the PDN GW allocates the IP address, if the new and old PDN GWs do not share the same IP address space, the UE must be notified of the change of the PDN GW.

Figure 33:
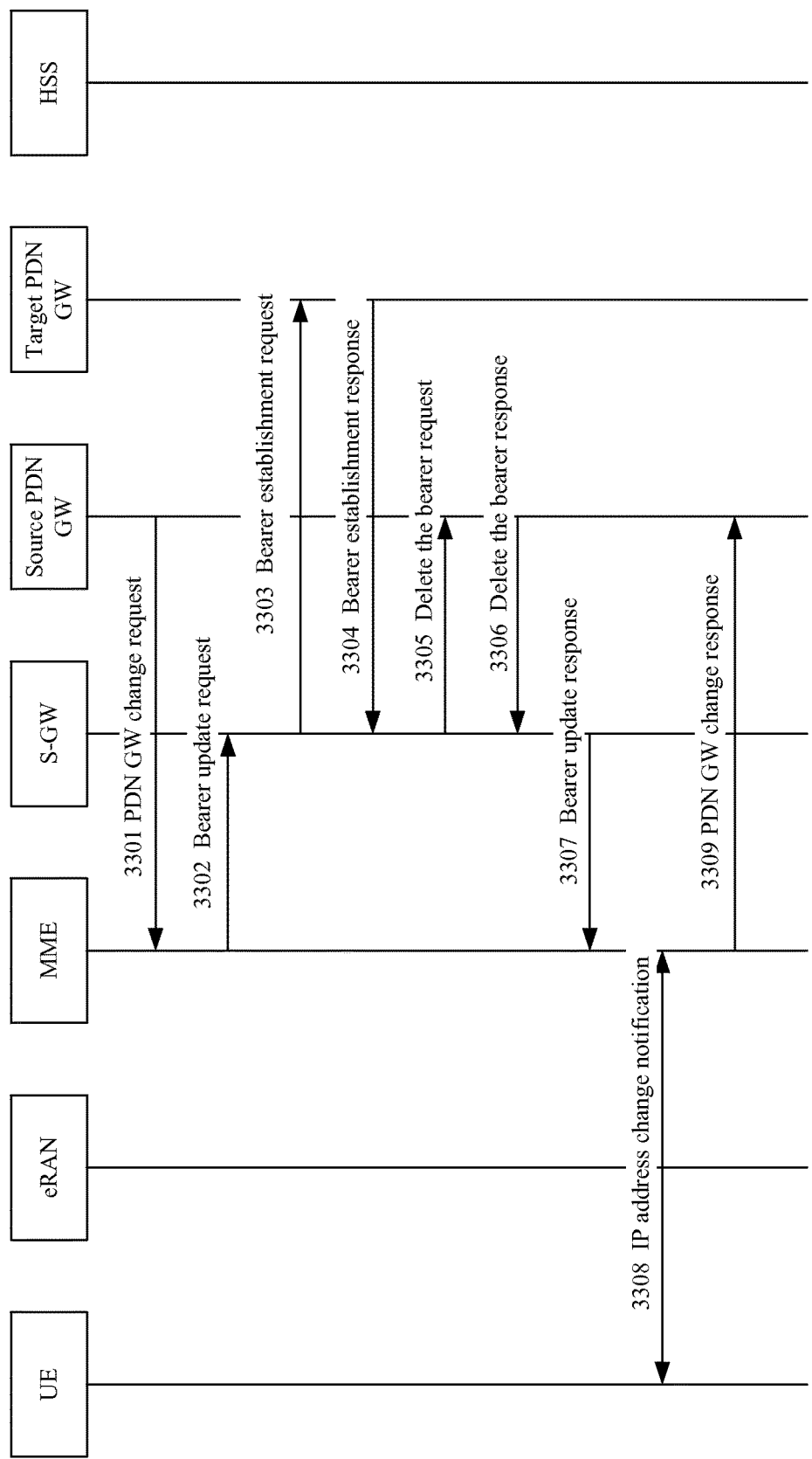
FIG. 33 is a flow chart of a transferring method when a packet data network gateway (PDN GW) changes in the network architecture of separated control plane and user plane according to an embodiment of the disclosure.

FIG. 18 is a flow chart illustrating an embodiment of the above circumstance based on an architecture specified in TR23.882. FIG. 33 is a flow chart of transferring based on an architecture specified in TS23.401. The two embodiments are slightly different in that the UE is notified after the CN side completes the GW replacement in this embodiment. Referring to FIG. 33, the process mainly includes the following steps.

In Step 3301, the source PDN GW sends a PDN GW change request to the MME.

In Step 3302, the MME sends a bearer update request to the S-GW, requesting for establishing a bearer between the S-GW and the target PDN GW for the UE to be transferred.

A target PDN GW address can be carried in the PDN GW change request sent by the S-GW to the MME in Step 3301, and the MME sends a bearer update request to the target PDN GW according to the received target PDN GW address. Or, the MME selects a PDN GW which is not the source PDN GW as a target PDN GW according to a preset mechanism.

In Step 3303, the S-GW sends to the target PDN GW a bearer establishment request carrying downstream bearer resource information allocated by the S-GW to the UE.

Here, it is unnecessary for the S-GW to re-allocate downstream bearer resources to the UE, and the S-GW may directly notify the target PDN GW of the downstream bearer resource information originally allocated to the UE.

In Step 3304, the target PDN GW records the received downstream bearer resource information, and returns to the S-GW a bearer establishment response carrying the upstream bearer resource allocated by the target PDN GW to the UE to be transferred. The S-GW parses and records the resource information. In addition, the IP address allocated by the target PDN GW to the UE is also carried in the response message.

In Step 3305, the S-GW sends a bearer delete request to the source PDN GW, so as to delete the user plane context of the UE to be transferred stored in the source PDN GW.

In Step 3306, after the deletion, the source PDN GW returns a bearer delete response to the S-GW.

In Step 3307, the S-GW sends to the MME a bearer update response carrying the IP address allocated by the target PDN GW to the UE.

In Step 3308, the MME notifies the UE of the change of the PDN GW and the IP address allocated by the target PDN GW to the UE.

In Step 3309, the MME returns a PDN GW change response to the source PDN GW.

It should be noted that, in the process of FIG. 33, a message is first sent to the MME, and the MME triggers the bearer establishment. However, in practice, it is unnecessary for the MME to trigger the bearer establishment. Instead, after the target PDN GW is selected, the target PDN GW directly triggers a downward bearer establishment.

Finally, it should be understood that the above embodiments are only used to explain, but not to limit the technical solution of the disclosure. Despite the detailed description provided with reference to above preferred embodiments, it should be understood that various modifications, changes or equivalent replacements can be made by those skilled in the art without departing from the scope of the disclosure and covered in the claims of the disclosure.

What is claimed is:

1. A method for transferring a user equipment (UE), comprising:
   receiving, by the UE from a source mobility management entity (MME) serving the UE, a transfer instruction carrying indication for transferring the UE through a tracking area update (TAU) process; and
   transmitting, by the UE, a TAU request to an evolved NodeB (eNodeB) after reception of the transfer instruction, wherein the TAU request carries identity information of the source MME set as null and the TAU request is used for requesting selection of a target MME that is different from the source MME.

2. The method according to claim 1, wherein the TAU request carries information that makes the eNodeB identify the UE as a new entrant.

3. The method according to claim 2, wherein the information that makes the eNodeB identify the UE as the new entrant is a temporary mobile subscriber identity (TMSI) set as Null.

4. The method according to claim 1, wherein the identity information is a temporary mobile subscriber identity (TMSI) set as Null.

5. The method according to claim 1, wherein the TAU request is used for requesting the selection of the target MME based on a load sharing mechanism.

6. The method according to claim 1, wherein the transfer instruction is a TAU instruction.

7. A user equipment (UE), comprising:
   a receiver, configured to receive, from a source mobility management entity (MME) serving the UE, a transfer instruction carrying indication for transferring the UE through a tracking area update (TAU) process;
   a processor, configured to generate a TAU request after reception of the transfer instruction; and
   a transmitter, configured to transmit the TAU request to an evolved NodeB (eNodeB), wherein the TAU request carries identity information of the source MME set as null and the TAU request is used for requesting selection of a target MME that is different from the source MME.

8. The UE according to claim 7, wherein the TAU request carries information that makes the eNodeB identify the UE as a new entrant.

9. The UE according to claim 8, wherein the information that makes the eNodeB identify the UE as the new entrant is a temporary mobile subscriber identity (TMSI) set as Null.

10. The UE according to claim 7, wherein the identity information is a temporary mobile subscriber identity (TMSI) set as Null.

11. The UE according to claim 7, wherein the TAU request is used for requesting the selection of the target MME based on a load sharing mechanism.

12. The UE according to claim 7, wherein the transfer instruction is a TAU instruction.

13. A non-transitory computer readable medium, comprising:
   a computer program code comprising one or more executable instructions, which, when executed by a user equipment (UE), causes the UE to perform a method comprising:
   receiving, from a source mobility management entity (MME) serving the UE, a transfer instruction carrying indication for transferring the UE through a tracking area update (TAU) process; and
   transmitting a TAU request to an evolved NodeB (eNodeB) after reception of the transfer instruction, wherein the TAU request carries identity information of the source MME set as null and the TAU request is used for requesting selection of a target MME that is different from the source MME.

14. The non-transitory computer readable medium according to claim 13, wherein the TAU request carries information that makes the eNodeB identify the UE as a new entrant.

15. The non-transitory computer readable medium according to claim 14, wherein the information that makes the eNodeB identify the UE as the new entrant is a temporary mobile subscriber identity (TMSI) set as Null.

16. The non-transitory computer readable medium according to claim 13, wherein the identity information is a temporary mobile subscriber identity (TMSI) set as Null.

17. The non-transitory computer readable medium according to claim 13, wherein the transfer instruction is a TAU instruction.

18. The non-transitory computer readable medium according to claim 13, wherein the TAU request is used for requesting the selection of the target MME based on a load sharing mechanism.

\* \* \* \* \*